(12) United States Patent
Zagula

(10) Patent No.: US 10,630,062 B2
(45) Date of Patent: Apr. 21, 2020

(54) ADJUSTABLE WIRE STRIPPER

(71) Applicant: RIPLEY TOOLS, LLC, Cleveland, OH (US)

(72) Inventor: Tadeusz Zagula, Newington, CT (US)

(73) Assignee: Ripley Tools, LLC, Cleveland, OH (US)

(*) Notice: Subject to any disclaimer, the term of this patent is extended or adjusted under 35 U.S.C. 154(b) by 124 days.

(21) Appl. No.: 15/899,489

(22) Filed: Feb. 20, 2018

(65) Prior Publication Data
US 2018/0248344 A1  Aug. 30, 2018

Related U.S. Application Data

(60) Provisional application No. 62/463,135, filed on Feb. 24, 2017.

(51) Int. Cl.
  *H02G 1/12*  (2006.01)
(52) U.S. Cl.
  CPC ......... *H02G 1/1226* (2013.01); *H02G 1/1229* (2013.01); *H02G 1/1236* (2013.01)
(58) Field of Classification Search
  CPC ... H02G 1/1226; H02G 1/1236; H02G 1/1229
  See application file for complete search history.

(56) References Cited

U.S. PATENT DOCUMENTS

| | | | |
|---|---|---|---|
| 3,572,189 A | 3/1971 | Matthews | |
| 3,620,104 A * | 11/1971 | Horrocks | H02G 1/1226 30/90.1 |
| 3,659,483 A * | 5/1972 | Matthews | H02G 1/1226 30/90.1 |
| 3,665,603 A * | 5/1972 | Bilbrey | H02G 1/1231 30/90.7 |
| 3,820,420 A * | 6/1974 | Matthews | H02G 1/1226 30/91.2 |
| 3,978,582 A * | 9/1976 | Maytham | H02G 1/1226 30/90.1 |
| 4,104,791 A | 8/1978 | Sunahara | |
| 4,489,490 A | 12/1984 | Michaels et al. | |

(Continued)

FOREIGN PATENT DOCUMENTS

FR  2736475 A1  1/1997
WO  WO 2018/156557 A1 *  8/2018

*Primary Examiner* — Hwei-Siu C Payer
(74) *Attorney, Agent, or Firm* — DeLio Peterson & Curcio LLC; Todd A. Bayne, Jr.

(57) ABSTRACT

An adjustable wire stripper has a jaw for positioning a length of cable, a tool body for tangentially contacting the cable, a blade having a cantilevered loading ramp for cutting the insulation off the cable, and a blade angle adjustment shaft driven by an angle adjustment member. A frame member disposed between the jaw and the body adjusts the distance between the jaw and the body to accommodate cables of different diameters. The frame member relatively moves the jaw and the body with respect to each other along a line having a constant sliding angle. The angle adjustment shaft has a flange extending radially outwardly for driving the shaft to different angles of rotation with respect to the body. An optional assist spring bearing opposite the flange urges the flange against the blade angle adjustment member during movement of the flange to reduce backlash of the shaft.

29 Claims, 22 Drawing Sheets

(56) References Cited

U.S. PATENT DOCUMENTS

| | | | |
|---|---|---|---|
| 4,945,788 A | 8/1990 | Matthews | |
| 4,955,137 A | 9/1990 | Matthews | |
| 6,308,417 B1 * | 10/2001 | Ducret | H02G 1/1231 30/90.7 |
| 6,467,171 B2 * | 10/2002 | Tarpill | H02G 1/1221 30/90.1 |
| 2015/0082639 A1 | 3/2015 | Tews et al. | |
| 2018/0248344 A1 * | 8/2018 | Zagula | H02G 1/1226 |

\* cited by examiner

ADJUSTABLE WIRE STRIPPER

BACKGROUND OF THE INVENTION

1. Field of the Invention

The present invention is directed to a cable stripping tool for stripping insulation from the conductor core at the end of or midspan in an electric power cable.

2. Description of Related Art

Termination of a power cable involves stripping the outer jacket and insulation from the conductor core. There are many different combinations of primary and secondary cable sizes—creating a need for an installer to be able to prepare numerous cable sizes based on application needs, cable manufacturer and regional code requirements, and company specific installation instructions.

Some tools are built for application-specific purposes. They have one blade setting and one bore size specific to the cable geometry. These tools are narrowed in usability and not conducive to working across a range of sizes.

Other preparation tools are more flexible and utilize interchangeable bushings to allow the same basic tool frame to work across a range of application needs. Specifically sized bushings are used for different cable sizes within the same tool frame. Every time a worker changes to a different application, they must change the bushing in their tool. This can be time consuming and cause delays if the correct bushing is not available. Typically, tools utilizing interchangeable bushings are only used for end stripping applications. A different tool must be used for midspan access, which further complicates the range of tools the end user must utilize for a full range of cable preparation.

Adjustable tools as opposed to bushing/fixed tool designs are based on a configurable platform to accommodate different cable diameters and insulation thicknesses with one tool. These designs have a limitation on cable diameter range and tend to require more than one jaw size as the end user transitions from smaller to larger cable sizes. The blade depth is limited as the cable diameter changes.

Tools on the market may incorporate a V-jaw A that is 180° from a blade B, as shown by example in the provided FIGS. 1 and 2A-2B of the prior art in which a minimum cable diameter $C_{min}$ and maximum cable diameter $C_{max}$ are shown. In these tools, as the cable diameter changes, the relative contact point between the blade and the cable changes, resulting in variable cutting action and depth, and requiring adjustment of the blade set as shown by difference D (FIG. 2A).

Another limitation with existing tools having V-jaws is that the reaction force created as the blade cuts through the cable is not directly supported, such reaction force F being further exemplified in FIGS. 2A-2B of the prior art. Instead, reaction force F has components from the angle support causing cable shifting from the blade, resulting in an unstable cut. In FIG. 2A, the reaction force F is shown as existing on the side of the cable, such reaction force created by the contact point of the blade pushing against the cable during the stripping process. FIG. 2B is a closer view of the interaction in FIG. 2A, demonstrating the cable's shift out of the V-jaw A once blade B begins the cutting sequence. The cable also loses its proper alignment within the V-jaw.

On the V-jaw design, the clamping force must be higher to keep the cable positioned in the tool as demonstrated in FIGS. 2A-2B. The resulting rotational friction of the cut is increased. Higher clamping force equates to higher friction and poorer tool stability, making it harder to perform the stripping operation. Often, the adjustable platform needs to be repositioned during the cut to re-establish the clamping force on the cable, or the jaw must be retightened during the cut since the set-up becomes unstable and loosens when trying to make aggressive cuts. The resulting performance of the tool is unstable and difficult to keep the blade tracking in a consistent direction relative to the cable. This results in poor cut quality. Unintentional damage to the conductor core may also result. Since the V-jaw will not work across a wide range of diameters, the tool needs to be changed to a larger V-Jaw as the cable diameter increases.

Many tools on the market also utilize a fixed blade tracking (feed) angle, requiring an external supporting stop at the end of cut to get a clean square cut.

SUMMARY OF THE INVENTION

It would therefore be useful to have an adjustable cable stripping tool that allows for variable openings, blade depth adjustment, and blade tracking (feed) angle so the end user can adjust the feed for the application. The single adjustable tool will allow the end user to accomplish the same as a fixed tool with bushings. The same tool can also be used for end stripping and midspan stripping cable preparation.

Bearing in mind the problems and deficiencies of the prior art, it is therefore an object of the present invention to provide a cable stripping tool having means to strip power cable with adjustability, improved stability, and blade tracking.

It is another object of the present invention to provide a cable stripping tool method that results in a very stable cutting condition, reduced working forces and cable damage, and consistently supports the cable during heavy cuts.

Still other objects and advantages of the invention will in part be obvious and will in part be apparent from the specification.

The above and other objects, which will be apparent to those skilled in the art, are achieved in the present invention which is directed to a cable stripping tool for cutting insulation on an electrical cable comprising a jaw, a body, a blade, and a frame member. The jaw positions a length of cable having a longitudinal axis, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle (β) between the first and second jaw portions. The body tangentially contacts the cable insulation at a third position peripherally spaced from the first and second positions on the insulation. The blade cuts the cable insulation and is adjustably mounted on the body to move toward and away from the cable. The frame member is between the jaw and the body, and adjusts the distance between the jaw and the tool body to accommodate different cable diameters, the frame member relatively moving the jaw and the body with respect to each other along a line having a constant sliding angle (α) with respect to the first line that is less than the jaw angle.

In an embodiment, the blade has a first cutting edge oriented about parallel to the first line. The blade may further have a second cutting edge oriented about perpendicular to the first cutting edge and a midspan cutting edge. A portion of the body contacting the cable insulation may form a loading ramp to hold the cable in position against the frame member. The blade may be moveable toward and away from the cable along a line about parallel to the first line. The jaw angle may be about 90° and the sliding angle between about 20° and about 30° with respect to the first line. The jaw angle may also be about 90° and the sliding angle (α) about 26.57° with respect to the first line. The jaw angle may still further be about 90° and the blade contacts the cable insulation at a position substantially diametrically opposite the second position. The blade may contact the cable insulation at a position substantially where a line extending from the intersection of the first and second lines at the sliding angle (α) intersects the periphery of cable insulation. The frame member may comprise one or more elongated posts longitudinally aligned along the sliding angle (α). The cable stripping tool may further include a clamping screw for adjustably securing a cable between the body and the jaw. The blade may be adjustable relative to the body between a position cutting the cable insulation 90° to the cable axis and a position cutting the cable insulation more or less than 90° to the cable axis.

In another aspect, the present invention is directed to a method for cutting insulation on an electrical cable. The method provides a cable, a jaw, a body, a blade, and a frame member. The jaw positions a length of cable having a longitudinal axis, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle (β) between the first and second jaw portions. The body tangentially contacts the cable insulation at a third position peripherally spaced from the first and second positions on the insulation. The blade cuts the cable insulation and is adjustably mounted on the body to move toward and away from the cable. The frame member is between the jaw and the body, and adjusts the distance between the jaw and the tool body to accommodate different cable diameters, the frame member relatively moving the jaw and the body with respect to each other along a line having a constant sliding angle (α) with respect to the first line that is less than the jaw angle. The method comprises the steps of adjusting the distance between the jaw and the tool body, and cutting the cable insulation by setting the blade to the desired depth of cut and rotating the cable stripping tool relative to the cable and using the blade to remove cable insulation from the cable.

In yet another aspect, the present invention is directed to a cable stripping tool for cutting insulation on an electrical cable comprising a jaw, a body, a blade, and a frame member. The jaw positions a length of cable having a longitudinal axis and a diameter, the jaw including a first jaw portion for tangentially contacting the cable insulation at a first position and a second jaw portion for tangentially contacting the cable insulation at a second position peripherally spaced from the first position. The body contacts the cable insulation at a third position peripherally spaced from the first and second positions on the insulation. The blade cuts the cable insulation adjustably mounted on the body to move toward and away from the cable, the blade having a cutting edge contacting the cable insulation at a point diametrically opposite the second position. The frame member is between the jaw and the blade body and is for adjusting distance between the jaw and the tool body to accommodate different cable diameters, the frame member relatively moving the jaw and the blade body with respect to each other such that the blade cutting edge always contacts the cable insulation at a cut point diametrically opposite the second position.

In still a further aspect, the present invention is directed to a method for cutting insulation on an electrical cable. The method provides a jaw, a body, a blade, and a frame member. The jaw positions a length of cable having a longitudinal axis and a diameter, the jaw including a first jaw portion for tangentially contacting the cable insulation at a first position and a second jaw portion for tangentially contacting the cable insulation at a second position peripherally spaced from the first position. The body contacts the cable insulation at a third position peripherally spaced from the first and second positions on the insulation. The blade cuts the cable insulation adjustably mounted on the body to move toward and away from the cable, the blade having a cutting edge contacting the cable insulation at a point diametrically opposite the second position. The frame member is between the jaw and the blade body and is for adjusting distance between the jaw and the tool body to accommodate different cable diameters, the frame member relatively moving the jaw and the blade body with respect to each other such that the blade cutting edge always contacts the cable insulation at a cut point diametrically opposite the second position. The method comprises the steps of adjusting distance between the jaw and the tool body to the diameter of the cable, the frame member relatively moving the jaw and the blade body with respect to each other such that the blade cutting edge contacts the cable insulation at a cut point diametrically opposite the second position, and cutting the cable insulation by setting the blade to the desired depth of cut and rotating the cable stripping tool relative to the cable and using the blade to remove cable insulation from the cable.

In a further aspect, the present invention is directed to a cable stripping tool for cutting insulation on an electrical cable comprising a jaw, a body, a frame, a blade angle adjustment shaft, a blade angle adjustment member, and a blade. The jaw positions a length of cable having a longitudinal axis. The body tangentially contacts the cable opposite the jaw. The frame member is between the jaw and the blade body and adjusts distance between the jaw and the tool body to accommodate different cable diameters. The blade angle adjustment shaft is rotatably mounted in the body, the shaft having extending radially outwardly a flange for driving the shaft to different angles of rotation with respect to the body. The blade angle adjustment member bearing on one side of the flange moves the flange and drives the shaft to different angles of rotation. The blade cuts the cable insulation secured to the end of the blade angle adjustment shaft, the blade being adjustable by movement of the blade angle adjustment member against the flange between a position cutting the cable insulation 90° to the cable axis and a position cutting the cable insulation more or less than 90° to the cable axis.

In an embodiment, the cable stripping tool further includes an optional assist spring bearing on the opposite side of the flange to urge the flange against the blade angle adjustment member during movement of the flange to reduce backlash of the shaft. The assist spring may be a coil spring with a length adjustable to vary the force applied to the opposite side of the flange. The blade angle adjustment shaft may be moveable toward and away from the cable and jaw to vary the depth of cut of the blade into the cable insulation. The blade angle adjustment member may comprise a screw. The blade angle adjustment member may also comprise a lever. The lever may be slideable along the body.

In yet another aspect, the present invention is directed to a method for cutting insulation on an electrical cable providing a cable having a longitudinal axis, a jaw, a body, a frame, a blade angle adjustment shaft, a blade angle adjustment member, and a blade. The jaw positions a length of the cable. The body tangentially contacts the cable opposite the jaw. The frame member is between the jaw and the blade body and adjusts distance between the jaw and the tool body to accommodate different cable diameters. The blade angle adjustment shaft is rotatably mounted in the body, the shaft having extending radially outwardly a flange for driving the shaft to different angles of rotation with respect to the body. The blade angle adjustment member bearing on one side of the flange moves the flange and drives the shaft to different angles of rotation. The blade cuts the cable insulation secured to the end of the blade angle adjustment shaft. The method comprises the steps of adjusting the blade by moving the blade angle adjustment member against the flange to a desired position between cutting the cable insulation 90° to the cable axis and a position cutting the cable insulation more or less than 90° to the cable axis, and cutting the cable insulation by setting the blade to the desired depth of cut and rotating the cable stripping tool relative to the cable and using the blade to remove cable insulation from the cable.

In an embodiment, the method may further provide an optional assist spring bearing on the opposite side of the flange to urge the flange against the blade angle adjustment member during movement of the flange to reduce backlash of the shaft. The blade angle adjustment member may comprise a screw. The blade angle adjustment member may also comprise a lever. The lever may be slideable along the body. The blade may further have a vertical first cutting edge, a second cutting edge oriented about perpendicular to the first cutting edge and a midspan cutting edge. A portion of the body contacting the cable insulation may form a loading ramp to hold the cable in position against the frame member.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
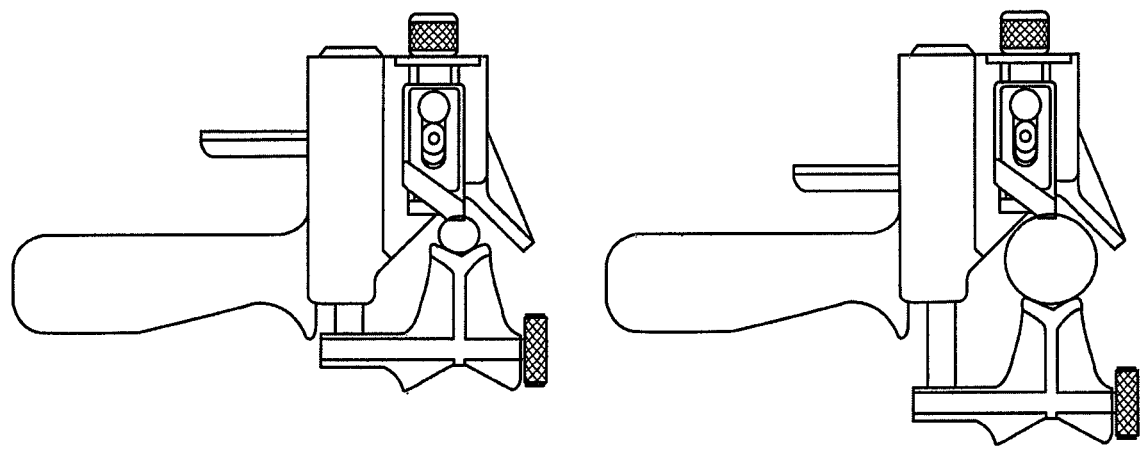
FIG. 1 shows cross-sectional side views of prior art wire stripping tools with cables held therein.

In describing the embodiment(s) of the present invention, reference will be made herein to FIGS. 3-28 attached hereto in which like numerals refer to like features of the invention.

An embodiment of the adjustable stripping tool 20 of the present invention as shown in FIGS. 3-12 includes a body 30 which houses an adjustable blade 50 and a slideably movable platform frame 60 with jaws 62 that can be positioned to clamp the cable 22 between the body and the jaw. An anti-friction pad 32 on body 30 contacts the cable surface. The blade depth is adjusted by rotating an adjustment knob 42 to account for different depth of cuts depending on the insulation or jacket thickness of the cable. Handles 80 and 82 extend vertically down and up from the slideable frame 60 and tool body 30, respectively, and may be grasped by the user to rotate the stripping tool 20 with respect to the cable to cut and/or remove the cable insulation with the blade 50.

Figure 11:
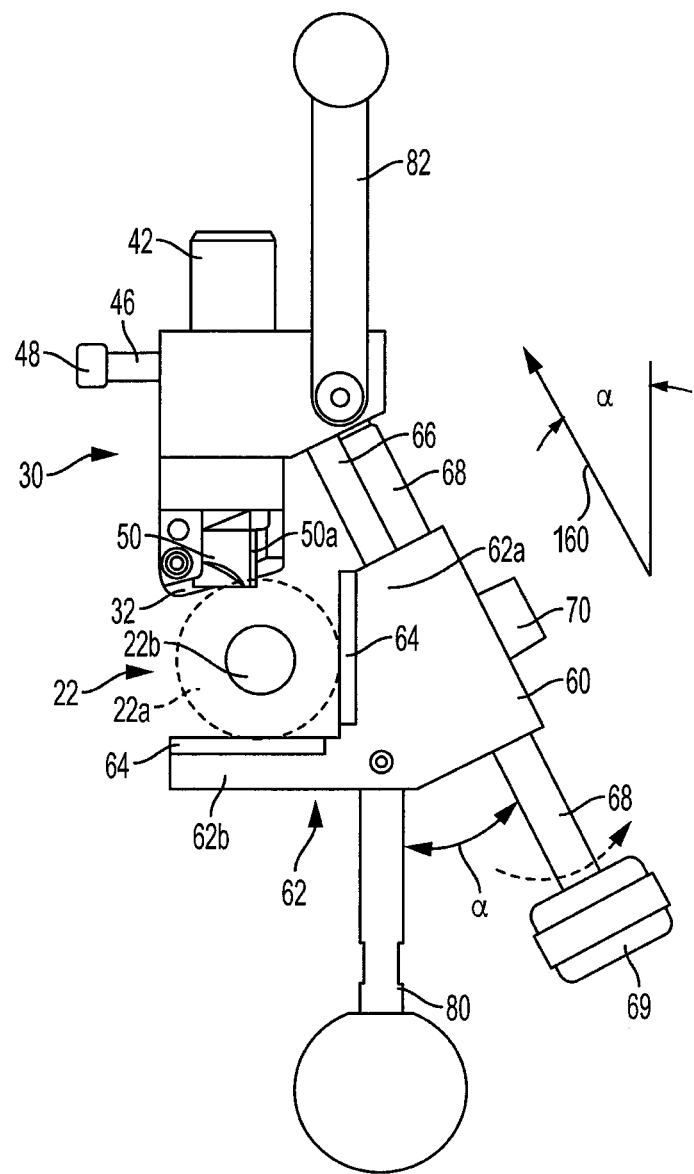
FIG. 11 is a side view of the cable stripping tool of FIG. 3 showing the clamping action against a cable having an insulation inserted in between the body and jaw.
Figure 12:
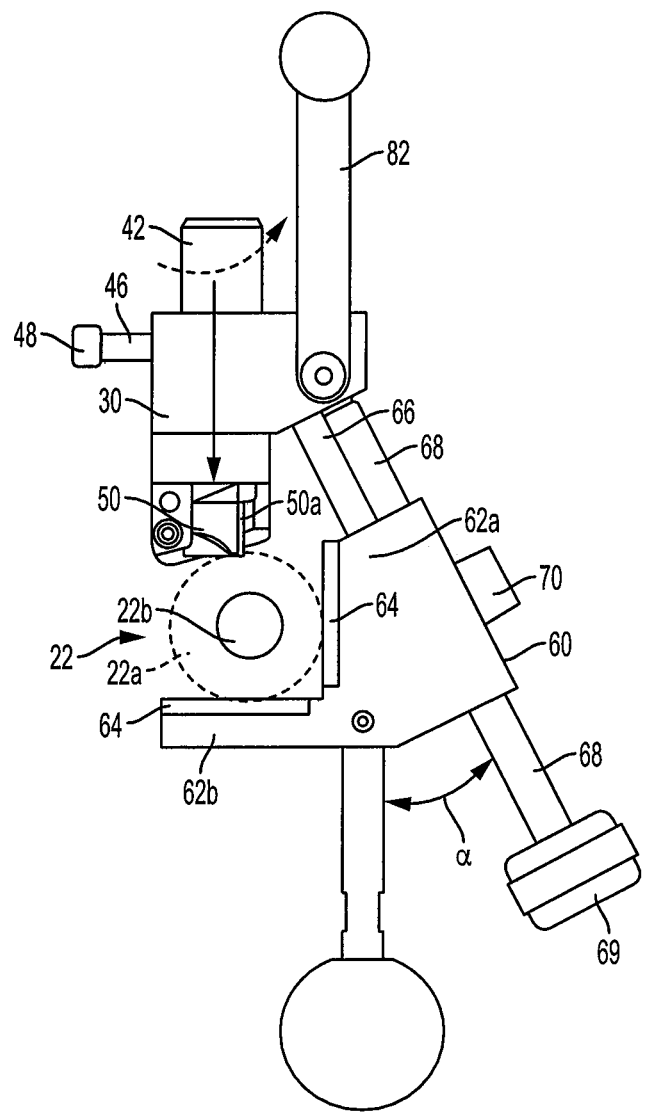
FIG. 12 is another side view of the cable stripping tool of FIG. 3 showing rotation of the blade adjust knob to increase/decrease the blade depth of cut.
Figure 24:
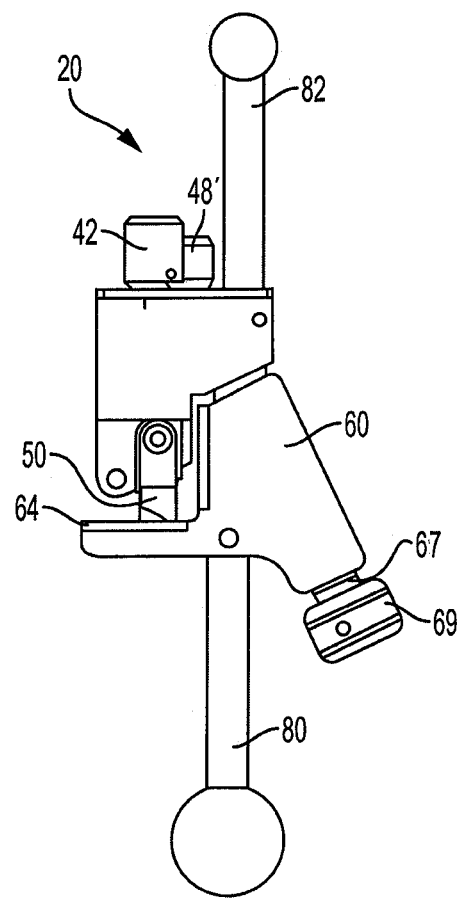
FIG. 24 is a side view of the embodiment of the cable stripping tool of FIG. 23.
Figure 25:
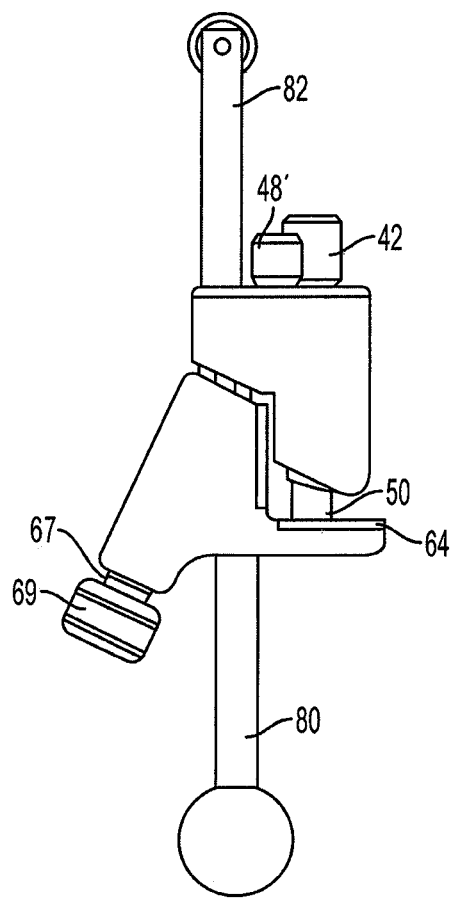
FIG. 25 is a side view of the opposite side of the embodiment of the cable stripping tool of FIG. 23.
Figure 26:
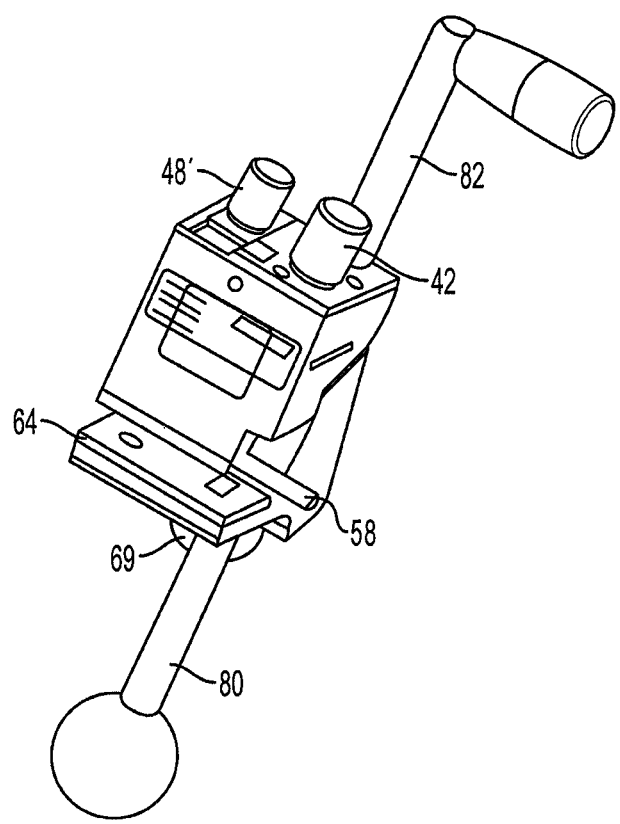
FIG. 26 is a perspective view of the embodiment of the cable stripping tool of FIG. 23.
Figure 27:
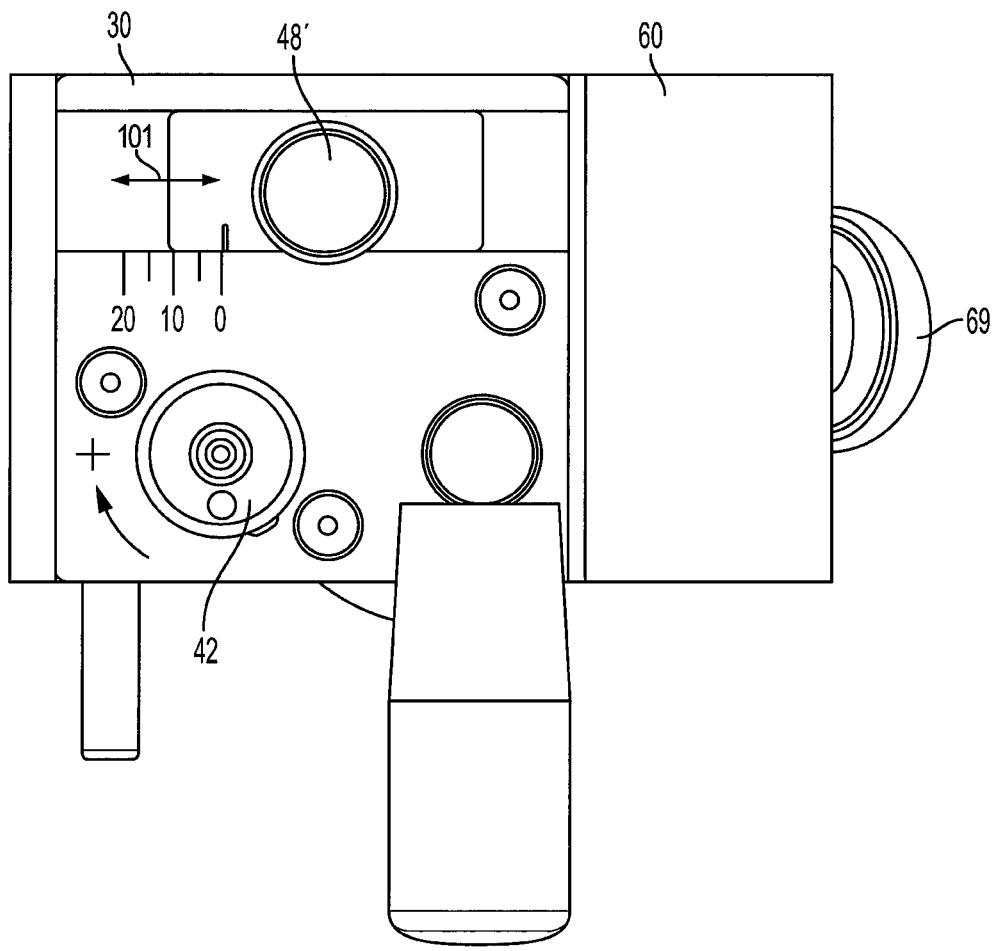
FIG. 27 is a top-down view of the embodiment of the cable stripping tool of FIG. 23.

As shown in FIGS. 11-12, the sliding jaw 62 is located on sliding platform frame 60 and has a first jaw portion 62a and a second jaw portion 62b, oriented at a 90° angle. Jaw 62 is guided by sliding posts 66 extending from body 30 through sliding platform frame 60 for tracking stability and anti-rotation. The sliding jaw 62 slides along the axis of the sliding posts 66 in a line of movement 160 (FIG. 11). A clamping screw and nut configuration 68 allows the jaw to be tightened and generate clamping force once it is in contact with the cable 22. For small jaw movements, the clamping screw 68 can be turned to move the jaw along the axis 160 of the sliding posts 66. For large jaw travel increments, a quick position feature is included. The spring loaded quick position button 70 can be pressed to allow the jaw 62 to freely travel along the posts until it meets the cable 22. The end user can then turn the clamping screw knob 68 to create the clamping pressure. The quick position button 70 can also be used to allow quick releasing from the cable 22. The sliding jaw also incorporates anti-friction pads 64 to assist with tool rotation once the clamping force is established. A Belleville washer 67 disposed between a clamping screw knob 69 and frame 60, around the clamping screw 68, allows for slight floating movement of the sliding platform in the event the cable 22 has an imperfect spherical form (FIGS. 24-25). This washer 67 urges the knob 69 and screw 68 downward to help stabilize the clamping pressure and allows for such irregularities in the cable 22 circumference, thus allowing the end user to create a constant clamping pressure on the cable 22 as the tool rotates around the cable.

The blade 50 depth can be adjusted to account for different thicknesses of insulation and outer jacket 22a. The blade adjust screw shaft 56 rotates to raise and lower the blade holder depending on the desired cut thickness. The tool can be used in an end strip configuration to expose the conductor 22b from the insulation 22a at the end of the cable 22. The blade holder is spring loaded so the tool can also be used to plunge into a section of cable to perform a midspan cut.

Figure 13:
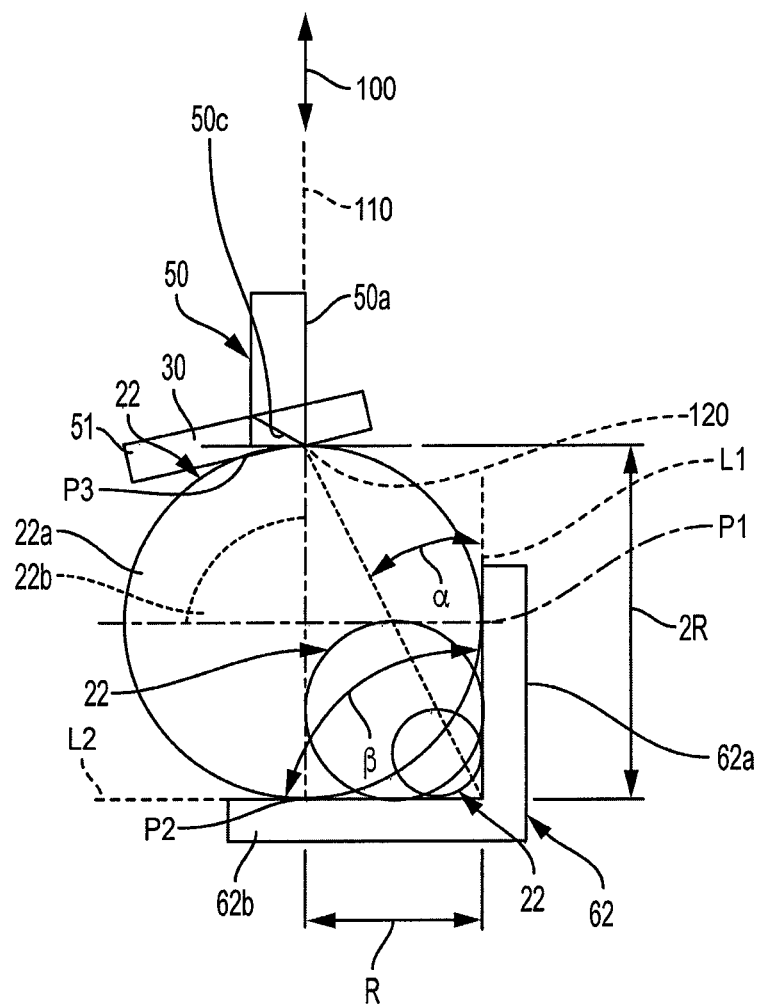
FIG. 13 is a cross-sectional view of a cable held between the jaw and body of an embodiment of the cable stripping tool of the present invention, showing the jaw angle between the jaw portions, the body and adjustable blade, and the constant sliding angle between the body and jaw along which the frame member slides to secure the cable therebetween.
Figure 21:
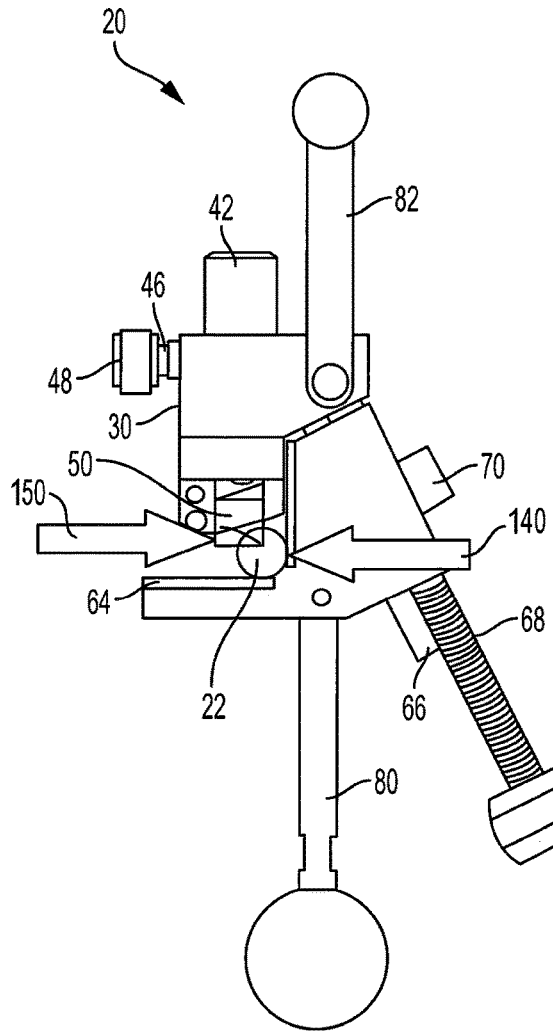
FIG. 21 is a side view of the cable stripping tool of FIG. 3 including a cable to be stripped.
Figure 22:
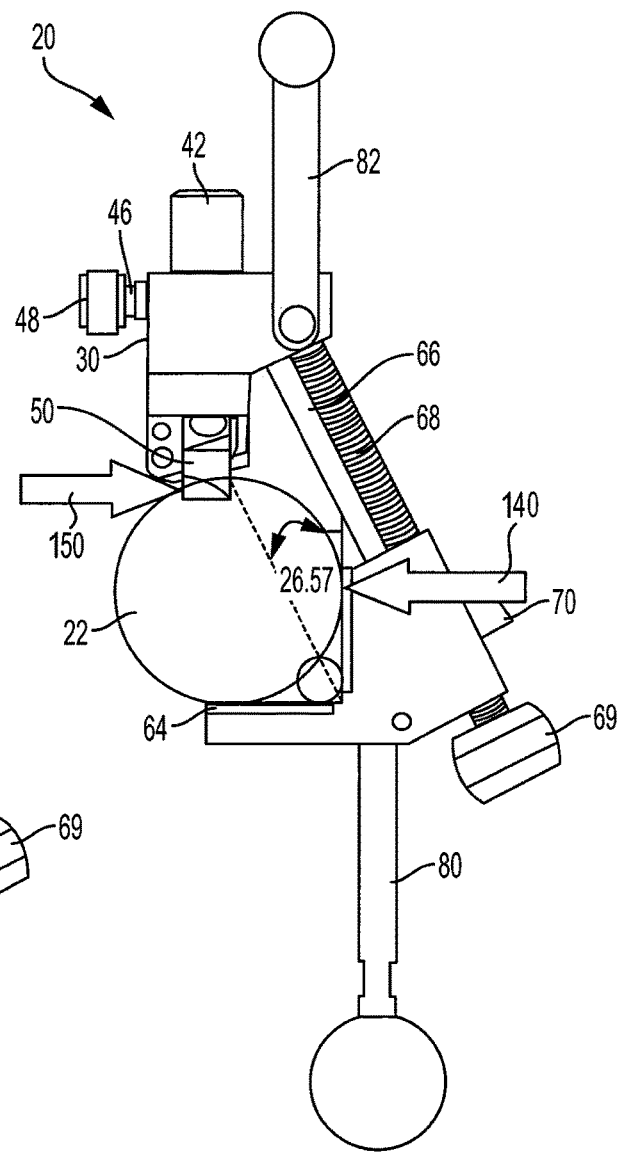
FIG. 22 is a side view of the cable stripping tool of FIG. 3 including a cable having a diameter much larger than the cable shown in FIG. 21.
Figure 23:
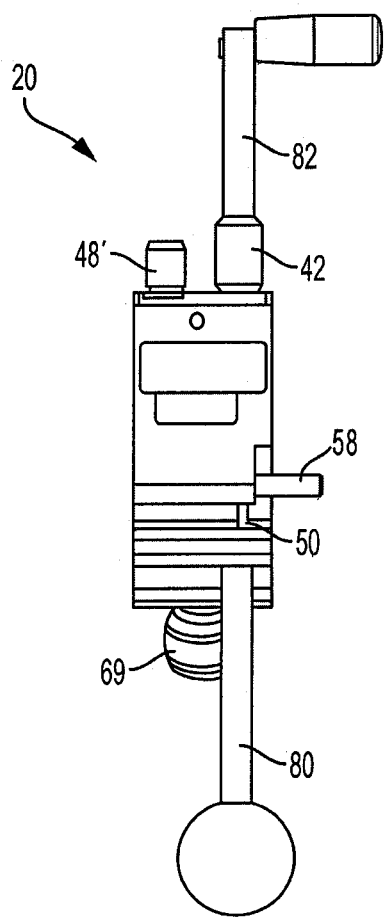
FIG. 23 is a frontal view of an embodiment of the cable stripping tool of the present invention utilizing a blade adjustment lever instead of a screw.

The clamping configuration permits the tool to work across a wide range of cable diameters with the same general support plane at the sliding jaw (FIGS. 13 and 21-22). The sliding action of the jaws is at a diagonal so that the tool may always orient the blade at the same tangent point of the cable. The blade may always be contacting the cable at the tangent center line, thus creating a constant sliding angle relative to the blade depth axis, for example 26.57° (FIGS. 21-22), regardless of cable diameter. For manufacturing purposes however, such a sliding angle is likely to be about 25°. A range from about 20° to about 30° may be used.

FIG. 13 shows a cross-section of a cable and the relative positioning of the jaw portions, blade body, and blade, and the line of movement of the frame member adjusted distance between the jaw and the blade body. Jaw 62 positions a length of the cable 22 having a longitudinal axis extending out of the page. The jaw includes a first jaw portion 62a that tangentially contacts the cable insulation 22a at a first position P1 and a second jaw portion 62b that tangentially contacts the cable insulation 22a at a second position P2 spaced from the first position P1 on the cable periphery. A first line L1 tangentially contacting the cable insulation at the first position P1 and a second line L2 tangentially contacting the cable insulation at the second position P2 intersect to form a jaw angle (β) between the first and second jaw portions 62a, 62b, which may be an angle of 90° as shown, although other angles are possible. Tool body 30 tangentially contacts the cable insulation at a third position P3 peripherally spaced from the first and second positions P1, P2 on the insulation. Blade 50 is adjustably mounted on the body 30 to move toward and away from the cable 22 in a blade movement direction 100 shown, and for a jaw angle β of 90° has a primary side cutting edge 50a that contacts the cable insulation at a cut point 120 diametrically (180°) opposite the second position P2. This cutting edge 50a is aligned along a line 110 that is about parallel to the first line L1, and at this about 90° jaw angle is aligned along a cable diameter that passes through the second position P2.

Figure 28:
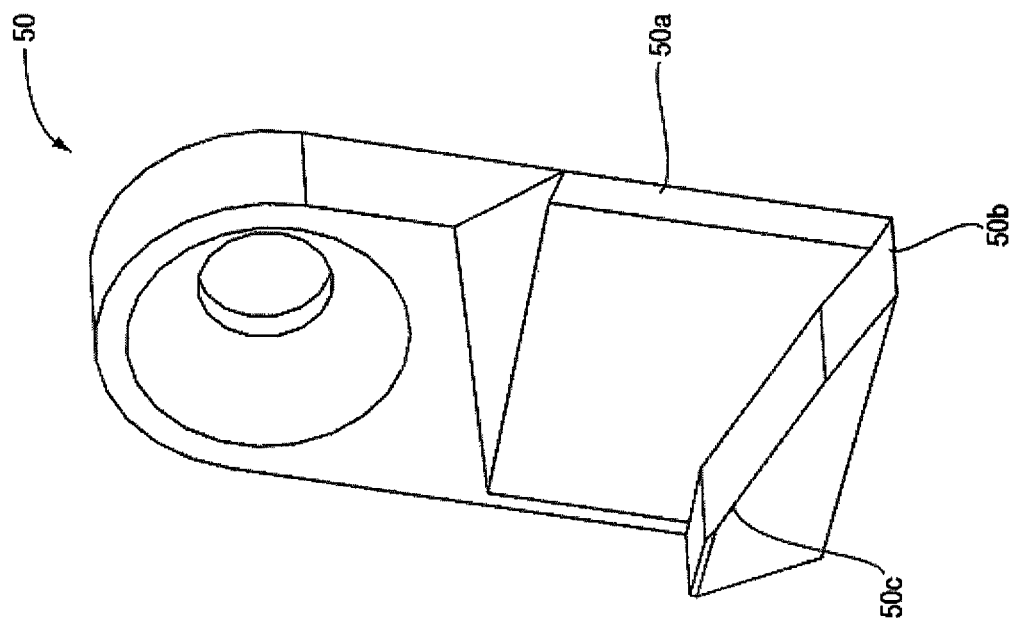
FIG. 28 is a perspective view of the cutting blade configuration used in the stripping tool of the present invention.

FIG. 28 shows the configuration of blade 50 used in an embodiment of the present invention in more detail. In particular, blade 50 has a vertical cutting edge 50a that intersects with a horizontal cutting edge 50b at the cut point 120 meant for contacting the cable (see FIG. 13). Such intersection between the vertical cutting edge 50a and horizontal cutting edge 50b is substantially perpendicular. Extending from horizontal cutting edge 50b is a midspan cutting edge 50c.

As shown in FIG. 13, the surface of body 30 contacting the cable functions as a loading or positioning ramp 51 to better hold the cable 22 in place against the jaws 62a and 62b during the cutting operation, eliminating the issues that would otherwise arise upon having a strictly vertical cutting edge contacting the cable—an issue that is prevalent in the prior art. Loading ramp 51 further has an angled surface to drive the cable 22 against the first line of action L1. Without this loading ramp, the cable would not be self-positioning against line L1 as the blade cuts.

The slideable frame member that connects the jaw 62 and the body 30 adjusts distance between the jaw and the tool body to accommodate different cable diameters. The angle of the sliding posts 66 on which the frame member 60 slides is such that the frame member moves the jaw and the body with respect to each other along a line having a constant sliding angle (α) with respect to the first line that is less than the jaw angle β (FIGS. 11 and 13). As shown in FIG. 13, a line originating at the intersection of the first and second lines L1, L2 at the sliding angle α intersects the periphery of cable 22 at the cut point of blade 50. More particularly, the angle is such that the blade primary side cutting edge 50a is always aligned along a line 110 that contacts the cable insulation at the same cut point position. Where the jaw angle β is about 90° between jaw portions 62a and 62b, the sliding angle α equals the tangent of the cable radius divided by the cable diameter (tg α=R/2R), which is 0.5, i.e., α=26.57° (FIG. 13).

While the sliding action of the jaw on existing tools on the market is parallel to the blade depth axis, the embodiments) of the present invention shown are based on about a 25° sliding angle, and the vertical cutting edge of the blade 50 is located at the exact centerline of the cable as shown in FIG. 13. However, different sliding angles may be used if there is a cutting/application advantage to have the blade located slightly forward of or behind the cable centerline. For ease of manufacturing purposes, such a sliding angle comes to be about 25°. However, a range from about 20° to about 30° may also be used with respect to the first line.

Figure 2A:
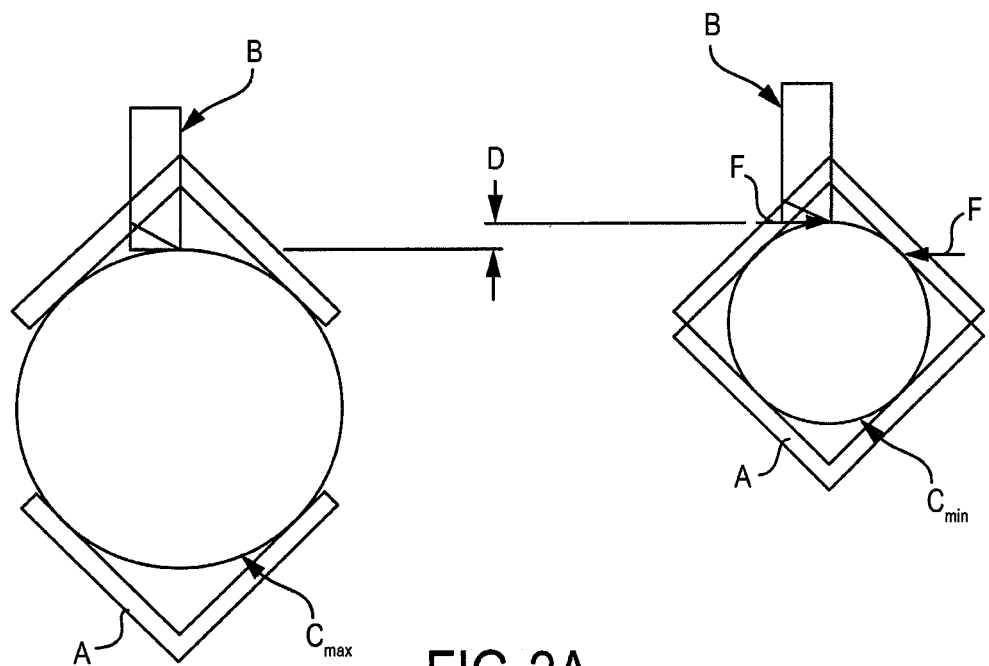
FIGS. 2A-2B are additional cross-sectional side views of prior art wire stripping tools with cables held therein, depicting the effects of the reactional forces exerted upon the cable.
Figure 2B:
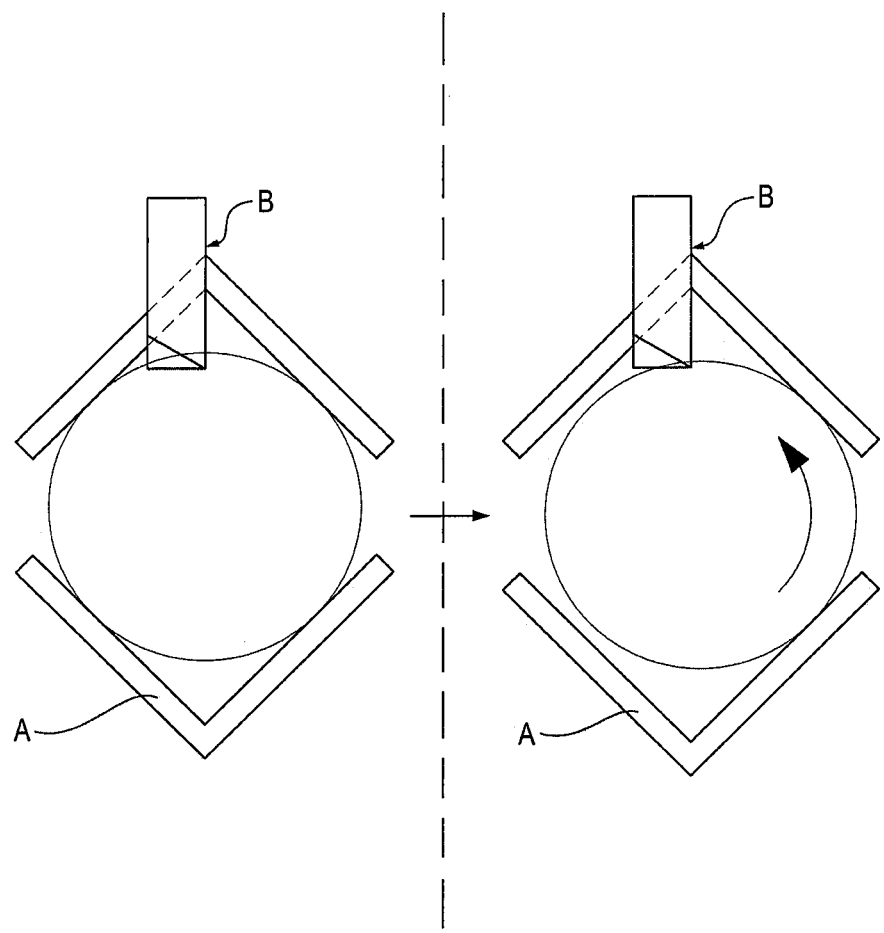
Figure 3:
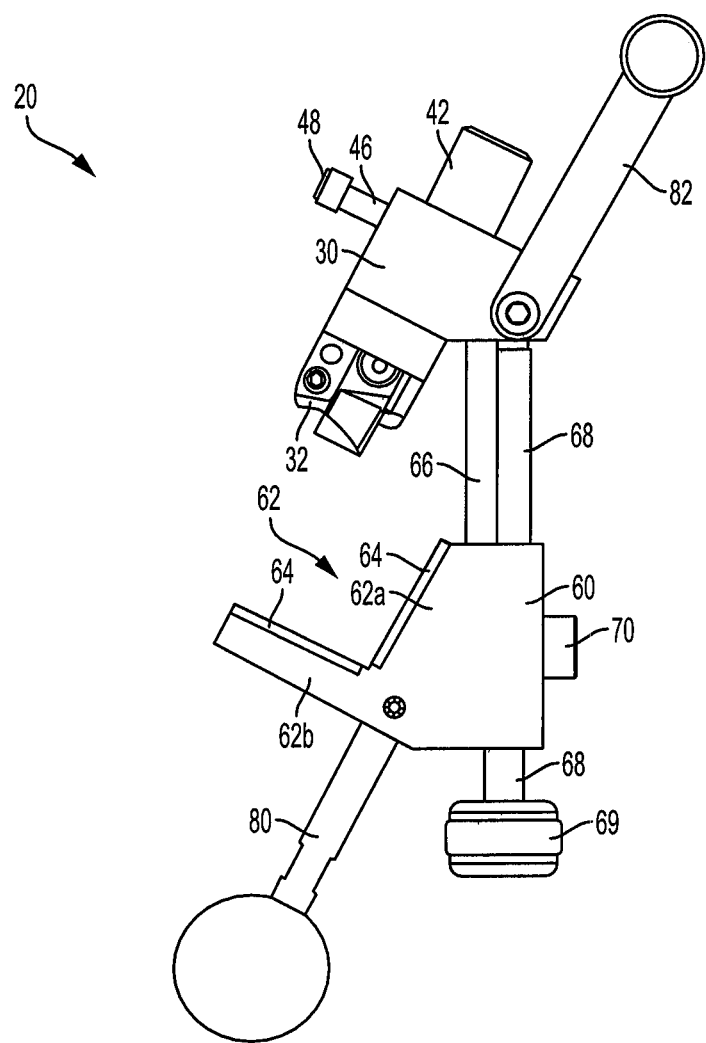
FIG. 3 is a side view of an embodiment of the cable stripping tool of the present invention.
Figure 4:
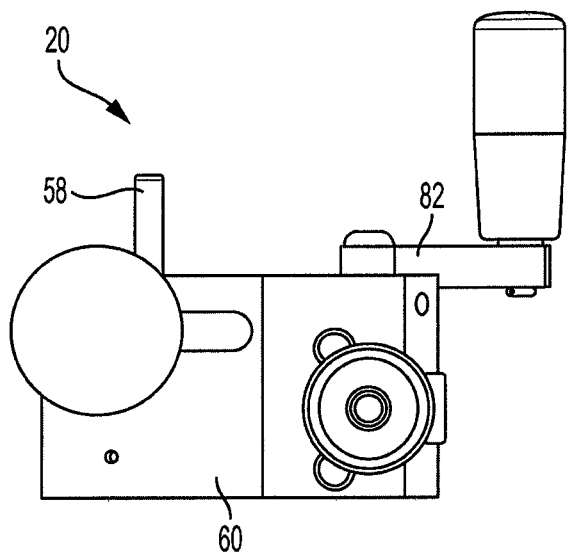
FIG. 4 is a bottom view of the cable stripping tool of FIG. 3.
Figure 5:
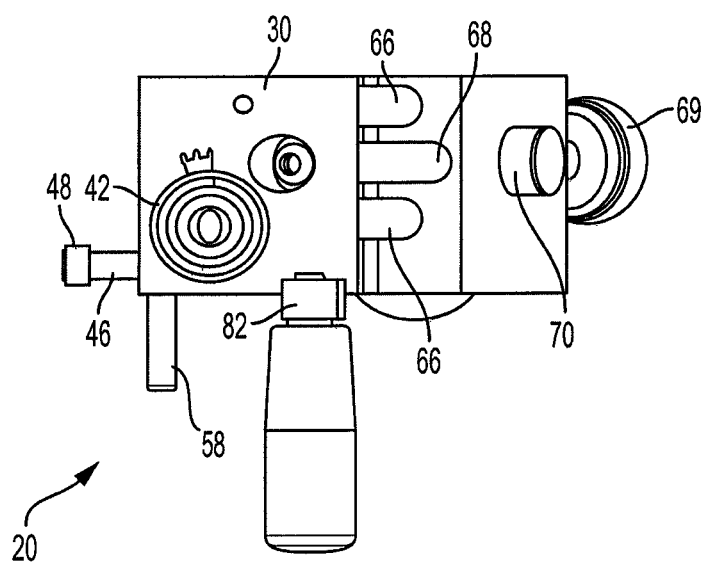
FIG. 5 is a top-down view of the cable stripping tool of FIG. 3.
Figure 6:
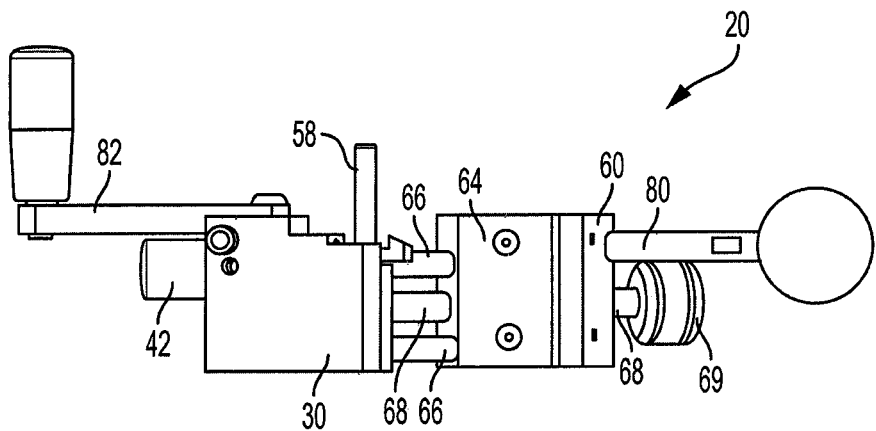
FIG. 6 is a front view of the cable stripping tool of FIG. 3.
Figure 7:
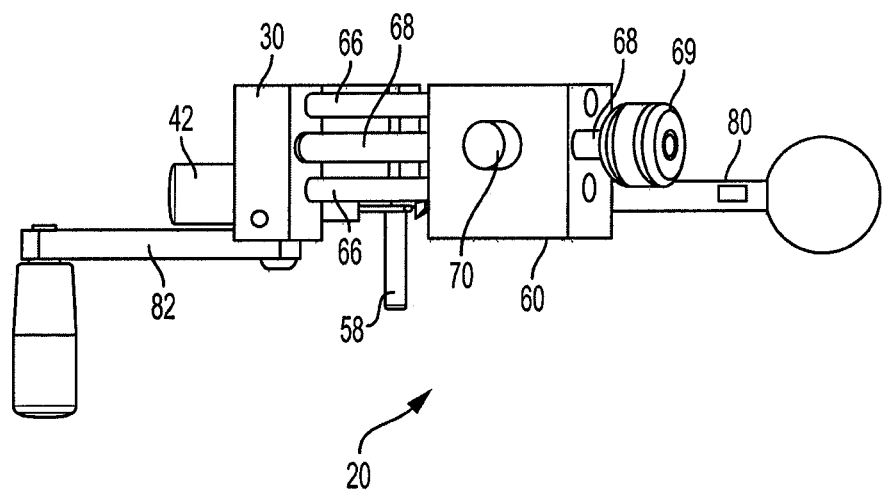
FIG. 7 is a rear view of the cable stripping tool of FIG. 3.
Figure 8:
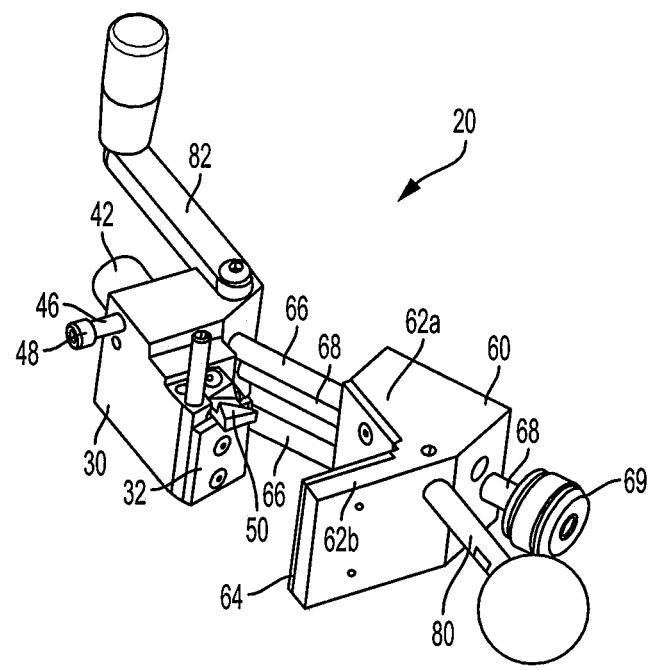
FIG. 8 is a perspective view of the cable stripping tool of FIG. 3.
Figure 9:
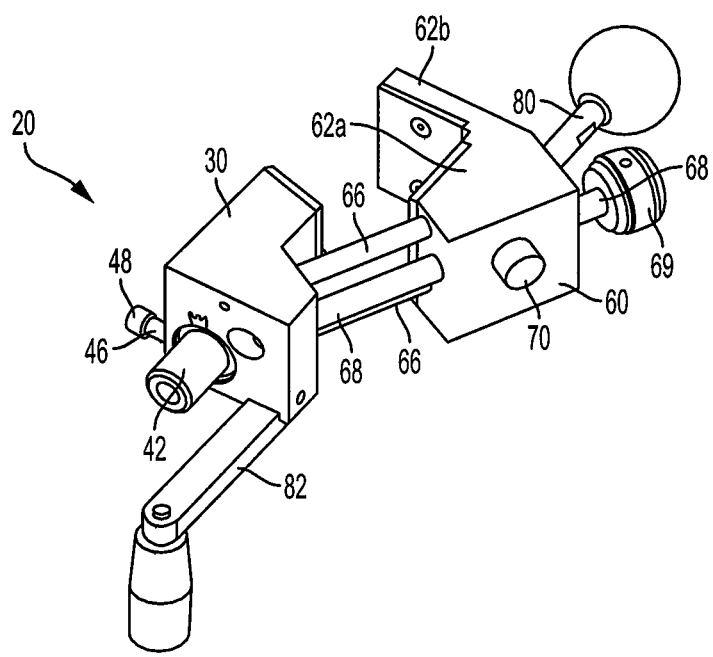
FIG. 9 is another perspective view of the cable stripping tool of FIG. 3.
Figure 10:
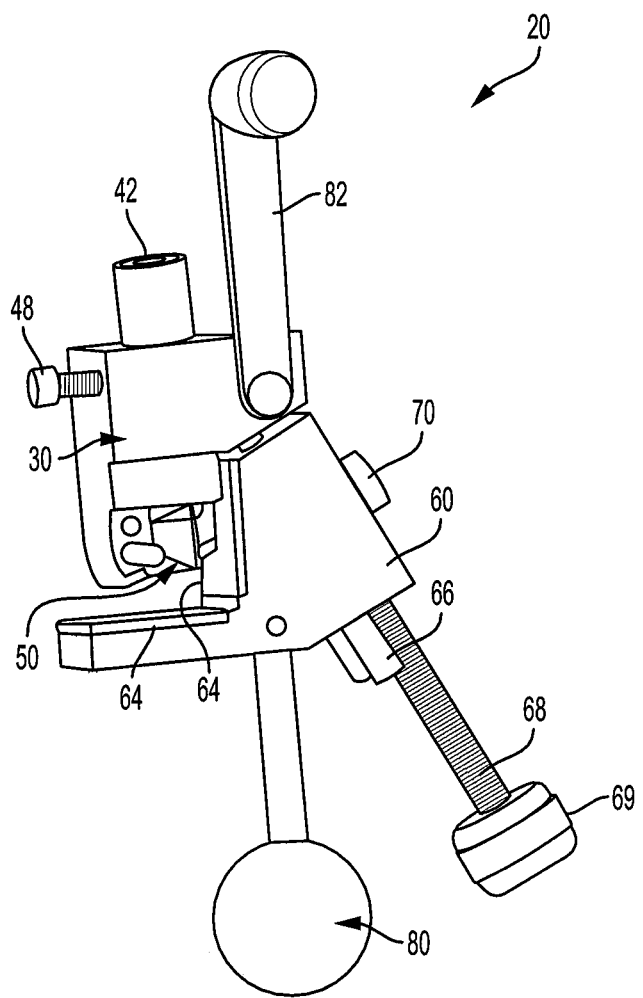
FIG. 10 is a perspective view of the cable stripping tool of FIG. 3 with the body and jaw fully clamped.

The blade orientation does not change and thus the cable is forced via the blade (such force indicated by arrows 150 in FIGS. 21 and 22) to the same support plane on the jaw (the jaw's reaction force indicated by arrows 140), creating the needed support along the line of cutting action that the prior art is shown to lack as depicted in FIGS. 1 and 2A-2B. The body may be configured with a loading or positioning ramp to provide upper support near the blade. As the cable diameter changes, the resulting reaction force is in the same approximate point along the jaw and body. The blade acts to drive the cable against the jaw and the resulting support is very stable and does not change as the tool is used for different cable diameters.

Figure 14:
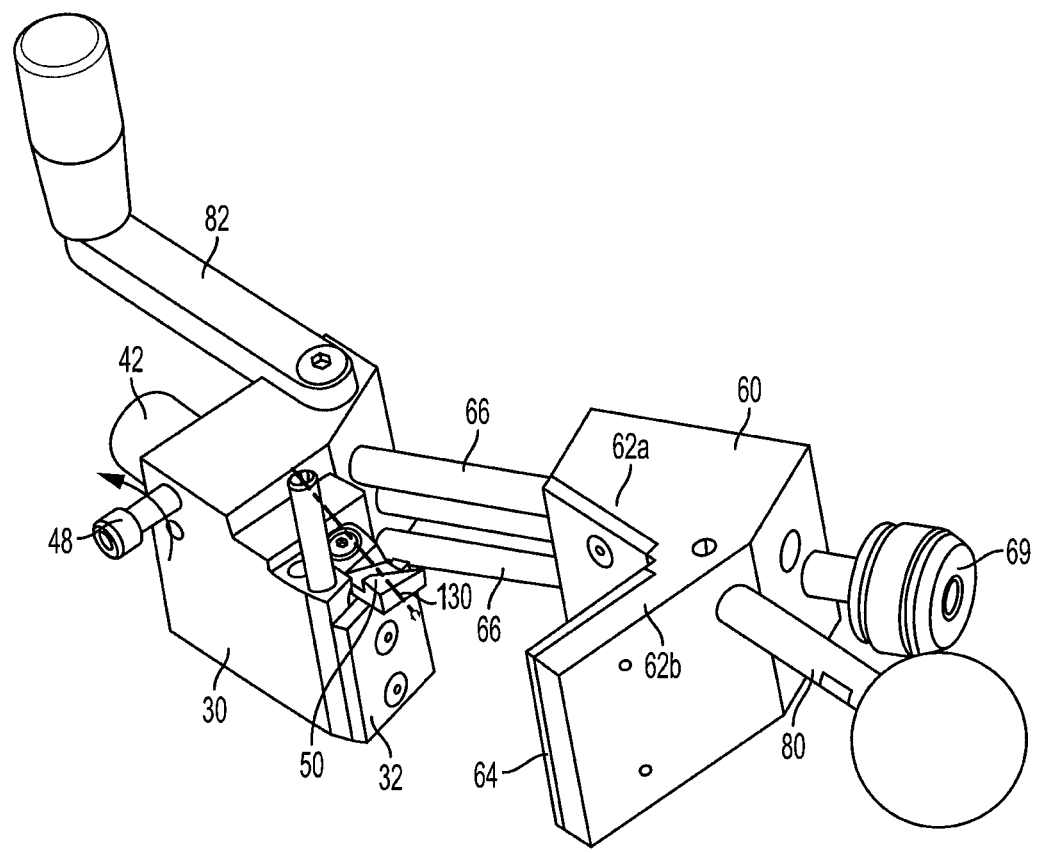
FIG. 14 is a perspective view of the cable stripping tool of FIG. 3 showing rotation of the angle adjusting screw to orient the blade tracking angle (between 0°-20°) for square or spiral cutting actions, and further depicting the internal spring action for maintaining a 0° blade position backlash.

The blade tracking (feed) angle can also be adjusted to alternately provide straight and spiral cutting. The tracking angle can be adjusted by turning the blade rotation adjusting knob 48 directly affixed to an angle adjust screw 46 (FIG. 14). The blade plane position is nominally 90° perpendicular to the cable axis (tracking angle =0.0°). This will result in a square/ring cut to clean up the jacket/insulation material at the end of the cut. The blade tracking angle can also be adjusted to different angles rotatable about the blade 50 longitudinal axis 130, for example 0°-20° from perpendicular for the embodiment shown in FIGS. 14-20. This will result in a spiral cut as the tool is rotated around the cable 22. As the blade tracking angle is increased, the cut speed is increased, i.e.—the resulting chip and rate of feed is increased. Depending on the material and cable configuration, the tracking angle can be adjusted for cut quality, handle force, and cut speed. At the end of the cut, the tracking angle can be changed back to zero degrees to generate clean up cut for a square end cut. A winding pin 58 located in front of the blade 50 helps to orient the rigid polyethylene chip (or any other type of plastic used) once it is cut away from the blade (FIGS. 5-7, 23 and 26). This pin 58 is secured into the body 30 via a threaded connection or tight-sliding fit, and therefore can be removed from the body based on end user preference. The blade adjust knob 48 and screw 46 drives a linkage that rotates the blade holder. The stripper of the present invention incorporates a return spring so the blade angle is controlled by the blade adjust screw 46 knob 48 mechanism, but an assist spring 52 ensures there is always zero backlash. This assist spring 52 permits the blade to return to exactly zero degrees for a proper clean-up cut. With the assist spring 52, when the tool is adjusted from 20 degrees back to zero degrees, the blade 50 will create a square cut with a smooth transition.

Figure 15:
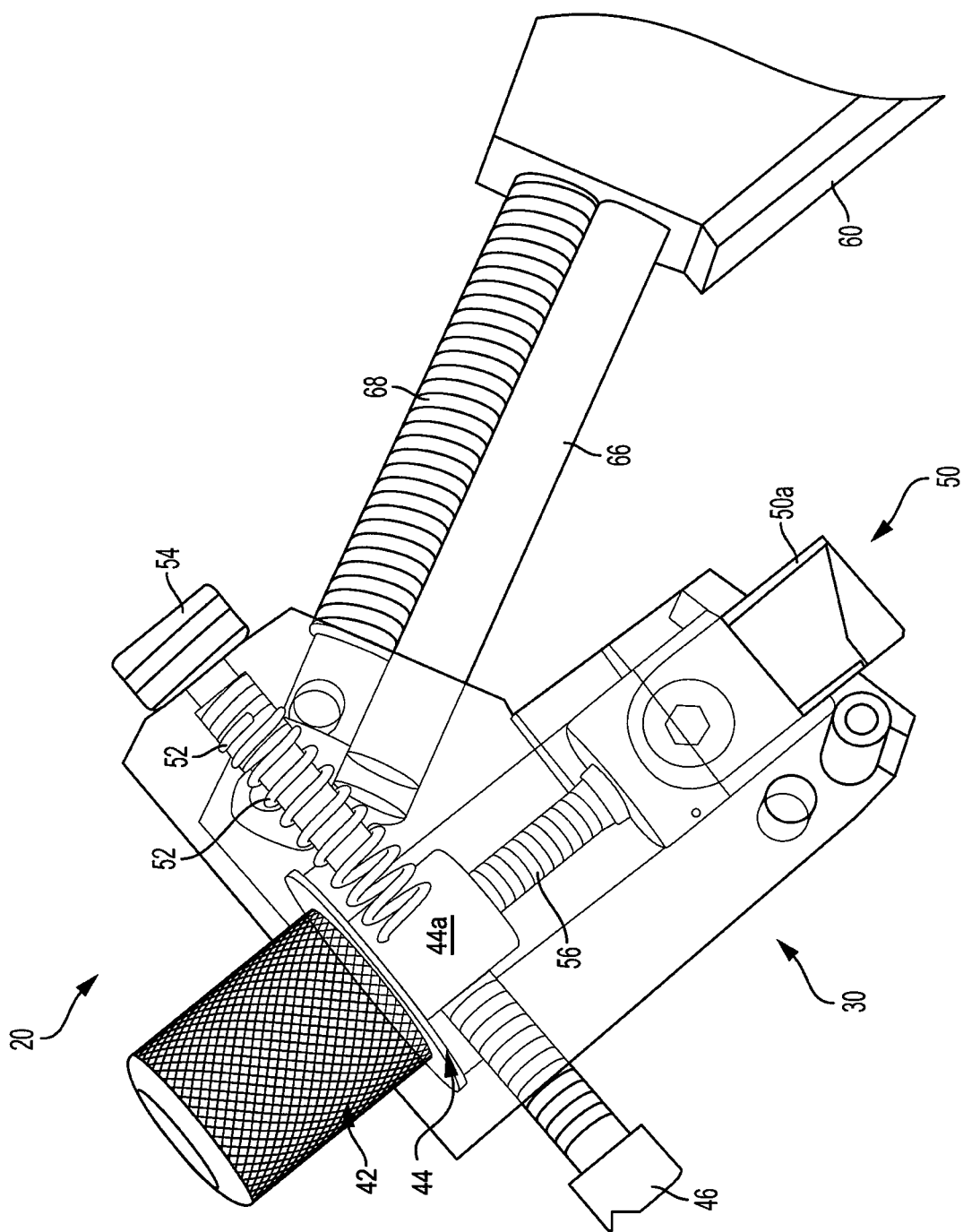
FIG. 15 is a close-up transparent view of the blade adjust knob and angle adjust screw interacting with the angle driver/flange to reposition the blade.
Figure 16:
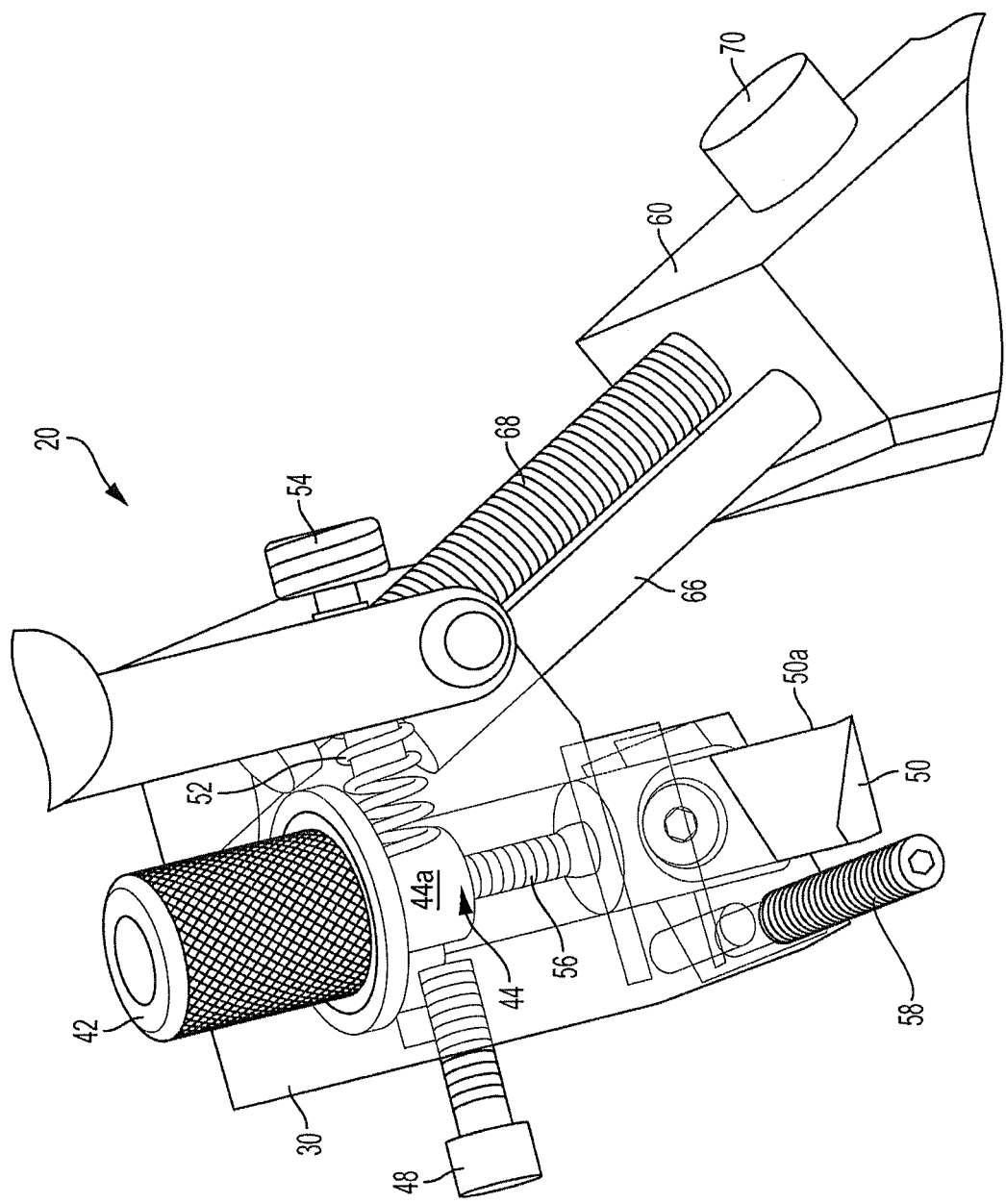
FIG. 16 is another close-up transparent view of the blade adjust knob and angle adjust screw of FIG. 14.
Figure 17:
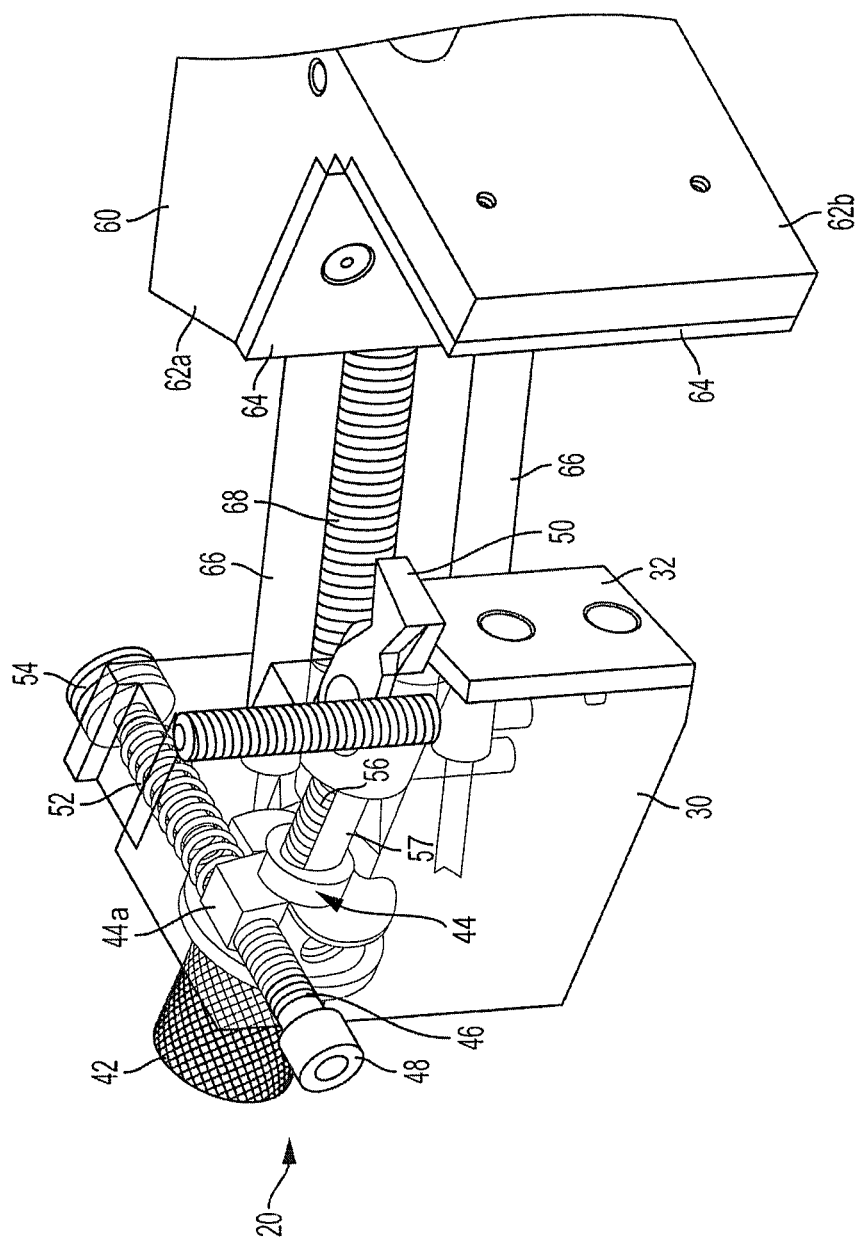
FIG. 17 is another perspective transparent view of the blade adjust knob and angle adjust screw of FIG. 14.
Figure 18:
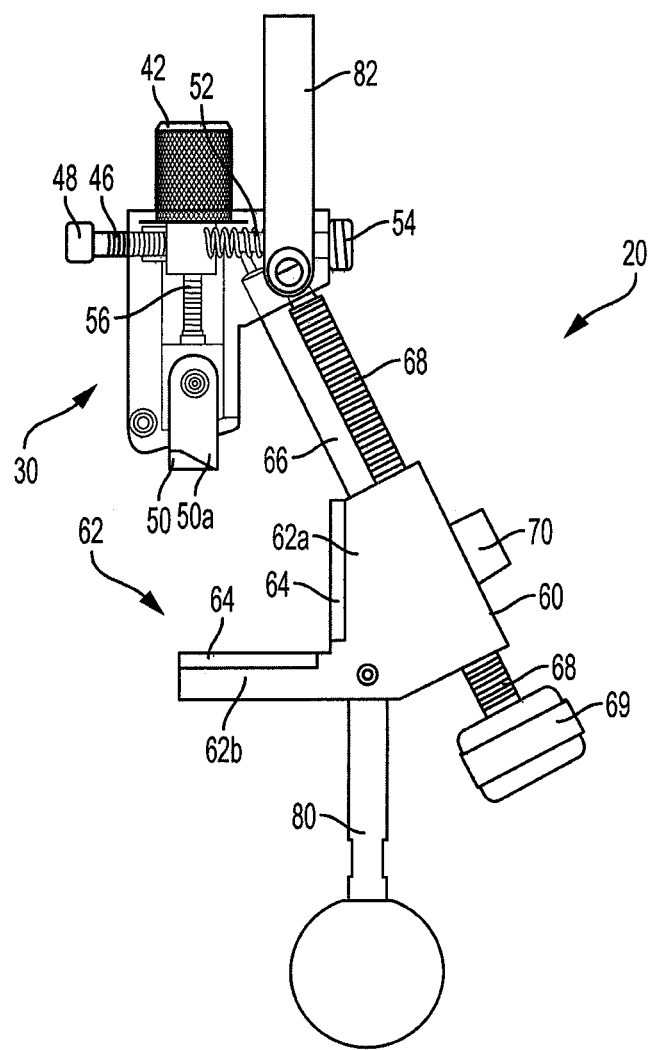
FIG. 18 is a partially-transparent side view of the cable stripping tool of FIG. 3 showing the interactivity between the blade adjust knob, angle adjust screw, and angle driver/flange of FIG. 14.
Figure 19:
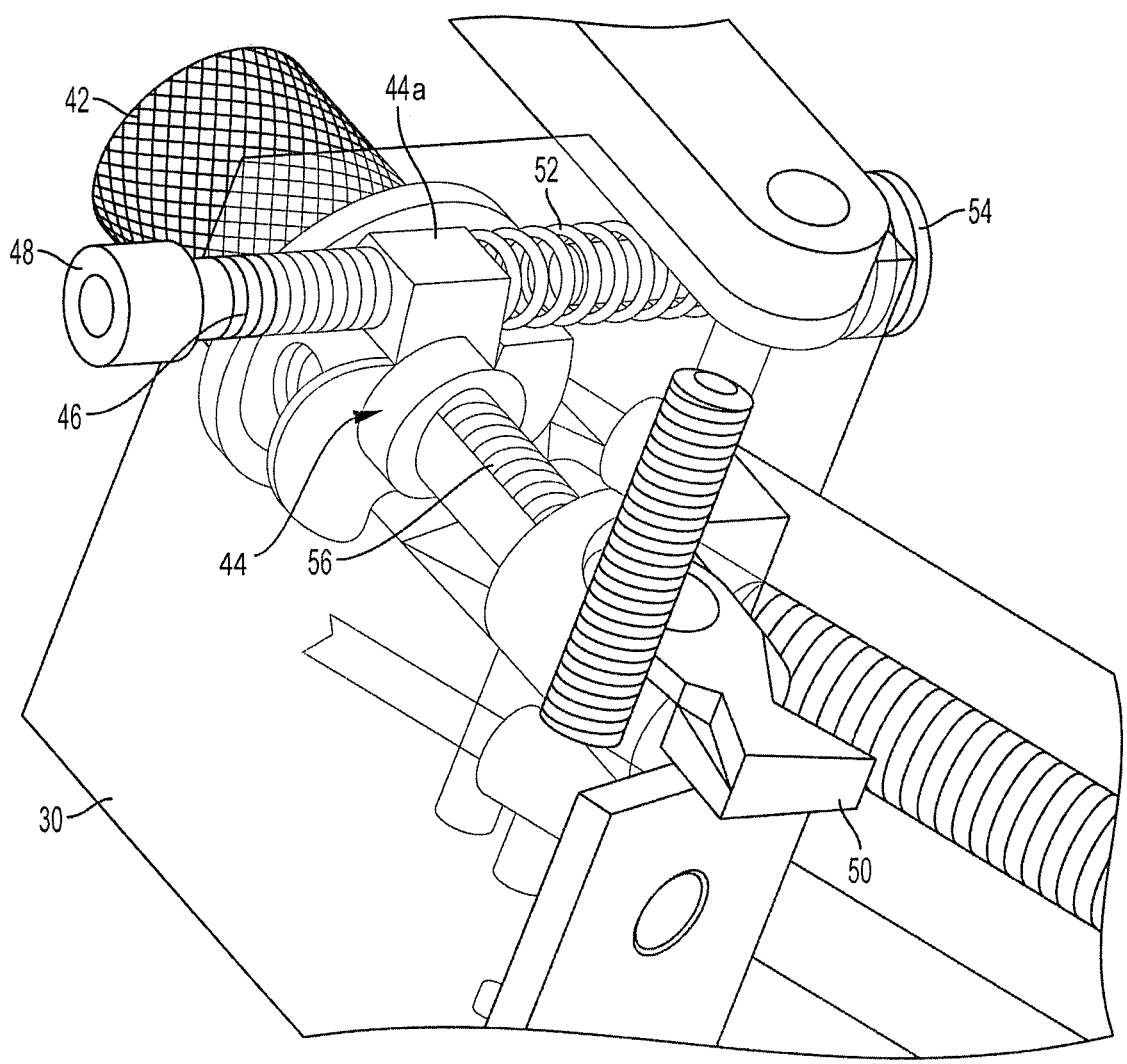
FIG. 19 is still another perspective transparent view of the blade adjust knob and angle adjust screw of FIG. 14.
Figure 20:
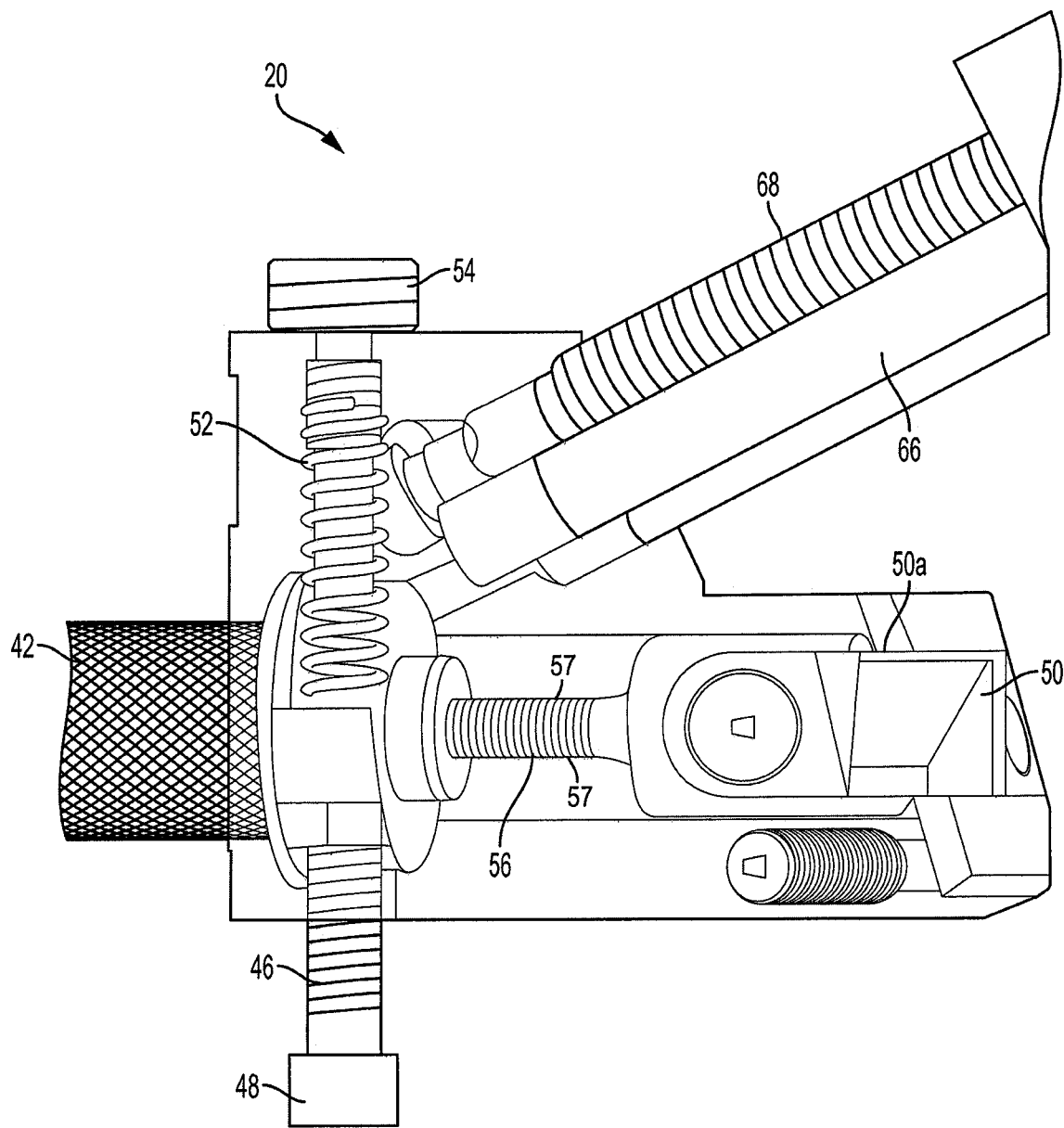
FIG. 20 is another transparent side view of the blade adjust knob and angle adjust screw of FIG. 14.

The adjust screw 46 and assist spring 52 are shown in more detail in FIGS. 12-19. In body 30 an opening aligned with the position of a cable 22 in the jaw holds a threaded shaft 56 that has a blade holder for blade 50 at one end, and a blade depth adjust knob 42 at the opposite outer end. Screw shaft 56 has flats 57 along opposite sides and is received in comparably threaded angle driver 44, which has walls conforming to the flats on the screw shaft (FIGS. 17 and 20). Screw shaft 56 acts as both a blade angle adjustment shaft and a blade depth adjustment shaft. Upon rotation of knob 42, screw shaft 56 moves longitudinally through angle driver 44 to move blade 50 toward and away from the cable 22 to adjust the depth of cut of the cable insulation 22a (FIG. 12). Angle driver 44 is rotatingly mounted in body 30 and has a radially extending flange 44a. The adjust knob 48 and screw 46, which is mounted in a comparably threaded opening in body 30, is rotated and creates rotary motion of the angle driver 44. The adjust screw 46 may be pinned or just provide direct contact to the angle driver flange 44a—either design option works the same. A coiled assist spring 52 bears on the angle driver flange 44a on the side opposite the adjust screw 46. As the adjust screw 46 moves in, its end contacts and bears upon the angle driver flange 44a and creates rotary motion about the axis of the angle driver 44, which then causes rotation of screw shaft 56 by the contact between the angle driver walls and the screw shaft flats (FIG. 15). The blade holder and blade 50 at the end of screw shaft 56 are also rotated with the angle driver 44. As the assembly rotates the blade tracking angle from 0° up to 20°, the blade rotates from the square to the spiral cut position. The rotary motion imparted to angle driver 44 also act to compress the assist spring 52. As the angle adjust screw 46 is rotated back out to reset the blade back to the 0° orientation, the assist spring 52 exerts return pressure on the angle driver (and blade). This constant pressure eliminates the backlash in the angle driver position and drives the position precisely back to the 0° orientation. The angle driver is pressed firmly against the zero position stop, creating a hard stop with zero backlash. The force applied by the assist spring may be varied by a threaded assist spring adjuster 54 which may be rotated to compress or relax the length of the spring.

An alternate configuration (FIGS. 23-27) eliminates the adjust screw knob 48 and screw 46 and instead utilizes a direct drive on the angle driver (such as a lever 48'; see FIG. 27) that will also create the rotary motion of the angle driver. Lever 48' slides in directions 101 to adjust the tracking angle of blade 50. The lever 48' locks in place to hold it in the corresponding set angle, depicted as a range between 0°-20° in FIG. 27 as an example. Other ranges can be set with this configuration based on end user preference, however. The interaction with the angle driver rotation, blade holder and spring is the same as the interactions described above using the screw 46 and knob 48. This configuration further eliminates the need for the assist spring which is otherwise meant to ensure that the blade returns to exactly 0° without any backlash, as previously described above.

Unlike the configurations and operation prior art tools that perform a similar cable stripping function, the cable stripping tool of the present invention provides a support point that is oriented directly in line with the reaction force of the cutting blade, and does not require a change of the jaw size as the cable diameter increases or excess tightening or retightening during the cut. The cable stripping tool of the present invention will accept a wider range of cable diameters and does not require the jaw to be changed.

The adjustable cable stripper of the present invention therefore provides one or more of the following features and advantages:

The stripper has angular jaw travel relative to the blade vertical adjust axis to provide constant tangential contact between the blade and cable, regardless of size. This ensures the cable is supported in the line of action of the blade cut, regardless of cable diameter. The support configuration between the sliding jaw and body self-position ramp crates positive reaction forces to the blade applied force. This results in a very stable cutting condition, reduces working forces and prevents the cable from shifting during heavy cuts.

The stripper has adjustable blade tracking to allow square and spiral cutting. An assist spring ensures that there is zero backlash in the tracking mechanism so the adjustment can be accurately adjusted from 0.0° to 20° and exactly back to 0.0° for a precise square cut. Alternatively, an adjustment lever may be used to accurately adjust from 0.0° to 20° and exactly back to 0.0° for a precise square cut without the need for an assist spring.

Additionally, the stripper has the same jaw configuration that works across a larger range of cable diameters without having to be changed to a different size, and has the same tangential contact point between the blade and cable, regardless of cable diameter for unlimited range of diameters. The stripper has movable jaws guided by support posts for stability, tracking and anti-rotation, as well as quick action jaw clap action, which allows the jaw to quickly be moved to meet the cable before the clamping screw creates the clamping pressure.

The stripper has an end stripping and a midspan blade to allow end stripping and mid span cuts, with precise, zero backlash blade depth and angle adjustment employing a blade angle positioning indicator.

The stripper has a support jaw with friction pads to reduce friction during cutting, a Belleville washer absorbing uneven cable size, and a winding pin for easy strip separation.

The stripper has replaceable handles, and an upper handle with crank extended over the front improves ergonomics and balances cutting and supporting forces during operation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cable stripping tool for cutting insulation on an electrical cable comprising:
    a jaw for positioning a length of cable having a longitudinal cable axis, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle ($\beta$) between the first and second jaw portions;
    a body for tangentially contacting the cable insulation at a third position peripherally spaced from the first and second positions on the insulation;
    a blade for cutting the cable insulation adjustably mounted on the body to move toward and away from the cable; and
    a frame member between the jaw and the body for adjusting distance between the jaw and the body to accommodate different cable diameters, the frame member relatively moving the jaw and the body with respect to each other along a line having a constant sliding angle ($\alpha$) between 20° and 30° with respect to the first line that is less than the jaw angle.

2. The cable stripping tool of claim 1 wherein the blade has a first cutting edge oriented parallel to the first line.

3. The cable stripping tool of claim 1 wherein a portion of the body contacting the cable insulation forms a loading ramp to hold the cable in position against the jaw.

4. The cable stripping tool of claim 1 wherein the jaw angle is 90°.

5. The cable stripping tool of claim 1 wherein the jaw angle is 90° and the sliding angle ($\alpha$) is 26.57° with respect to the first line.

6. The cable stripping tool of claim 1 wherein the blade contacts the cable insulation at a position substantially where a line extending from the intersection of the first and second lines at the sliding angle ($\alpha$) intersects the periphery of the cable insulation.

7. The cable stripping tool of claim 1 wherein the frame member comprises one or more elongated posts longitudinally aligned along the sliding angle ($\alpha$).

8. The cable stripping tool of claim 7 further including a clamping screw for adjustably securing the cable between the body and the jaw.

9. The cable stripping tool of claim 7 wherein the blade is adjustable relative to the body between a position for cutting the cable insulation at a 90° angle with respect to the cable axis and a position for cutting the cable insulation at more or less than a 90° angle with respect to the cable axis.

10. A cable stripping tool for cutting insulation on an electrical cable comprising:
    a jaw for positioning a length of cable having a longitudinal cable axis, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle ($\beta$) between the first and second jaw portions;
    a body for tangentially contacting the cable insulation at a third position peripherally spaced from the first and second positions on the insulation;
    a blade for cutting the cable insulation having a first cutting edge oriented parallel to the first line, a second cutting edge oriented perpendicular to the first cutting edge, and a midspan cutting edge, the blade adjustably mounted on the body to move toward and away from the cable; and
    a frame member between the jaw and the body for adjusting distance between the jaw and the body to accommodate different cable diameters, the frame member relatively moving the jaw and the body with respect to each other along a line having a constant sliding angle ($\alpha$) with respect to the first line that is less than the jaw angle.

11. A cable stripping tool for cutting insulation on an electrical cable comprising:
    a jaw for positioning a length of cable having a longitudinal cable axis, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle ($\beta$) between the first and second jaw portions;
    a body for tangentially contacting the cable insulation at a third position peripherally spaced from the first and second positions on the insulation;
    a blade for cutting the cable insulation adjustably mounted on the body to move toward and away from the cable along a line parallel to the first line; and
    a frame member between the jaw and the body for adjusting distance between the jaw and the body to accommodate different cable diameters, the frame member relatively moving the jaw and the body with respect to each other along a line having a constant sliding angle ($\alpha$) with respect to the first line that is less than the jaw angle.

12. A cable stripping tool for cutting insulation on an electrical cable comprising:
 a jaw for positioning a length of cable having a longitudinal cable axis, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle ($\beta$) of 90° between the first and second jaw portions;
 a body for tangentially contacting the cable insulation at a third position peripherally spaced from the first and second positions on the insulation;
 a blade for cutting the cable insulation adjustably mounted on the body to move toward and away from the cable; and
 a frame member between the jaw and the body for adjusting distance between the jaw and the body to accommodate different cable diameters, the frame member relatively moving the jaw and the body with respect to each other along a line having a constant sliding angle ($\alpha$) with respect to the first line that is less than the jaw angle;
 wherein the blade contacts the cable insulation at a position substantially diametrically opposite the second position.

13. A method for cutting insulation on an electrical cable comprising:
 providing a cable having a longitudinal cable axis and a cable insulation to be removed;
 providing a cable stripping tool having a jaw for positioning a length of the cable, the jaw including a first jaw portion for tangentially contacting the cable insulation at a first position and a second jaw portion for tangentially contacting the cable insulation at a second position peripherally spaced from the first position, wherein a first line tangentially contacting the cable insulation at the first position and a second line tangentially contacting the cable insulation at the second position intersect to form a jaw angle ($\beta$) between the first and second jaw portions;
 providing a body disposed on the cable stripping tool for tangentially contacting the cable insulation at a third position peripherally spaced from the first and second positions on the insulation;
 providing a blade for cutting the cable insulation adjustably mounted on the body to move toward and away from the cable; and
 providing a frame member of the cable stripping tool between the jaw and the body for adjusting distance between the jaw and the body to accommodate different cable diameters, the frame member relatively moving the jaw and the body with respect to each other along a line having a constant sliding angle ($\alpha$) between 20° and 30° with respect to the first line that is less than the jaw angle;
 adjusting distance between the jaw and the body to the diameter of the cable; and
 cutting the cable insulation by setting the blade to the desired depth of cut and rotating the cable stripping tool relative to the cable and using the blade to remove the cable insulation from the cable.

14. A cable stripping tool for cutting insulation on an electrical cable comprising:
 a jaw for positioning a length of cable having a longitudinal cable axis and a diameter, the jaw including a first jaw portion for tangentially contacting the cable insulation at a first position and a second jaw portion for tangentially contacting the cable insulation at a second position peripherally spaced from the first position;
 a body for tangentially contacting the cable insulation at a third position peripherally spaced from the first and second positions on the insulation;
 a blade for cutting the cable insulation adjustably mounted on the body to move toward and away from the cable, the blade having a cutting edge contacting the cable insulation at a cut point diametrically opposite the second position; and
 a frame member between the jaw and the body for adjusting distance between the jaw and the body to accommodate different cable diameters, the frame member relatively moving the jaw and the body with respect to each other such that the cutting edge always contacts the cable insulation at the cut point diametrically opposite the second position.

15. A method for cutting insulation on an electrical cable comprising:
 providing a cable having a longitudinal cable axis and a diameter, and a cable insulation to be removed;
 providing a cable stripping tool having a jaw for positioning a length of the cable, the jaw including a first jaw portion for tangentially contacting the cable insulation at a first position and a second jaw portion for tangentially contacting the cable insulation at a second position peripherally spaced from the first position;
 providing a body disposed on the cable stripping tool for tangentially contacting the cable insulation at a third position peripherally spaced from the first and second positions on the insulation;
 providing a blade for cutting the cable insulation adjustably mounted on the body to move toward and away from the cable, the blade having a cutting edge contacting the cable insulation at a cut point diametrically opposite the second position; and
 providing a frame member of the cable stripping tool between the jaw and the body for adjusting distance between the jaw and the body to accommodate different cable diameters;
 adjusting distance between the jaw and the body to the diameter of the cable, the frame member relatively moving the jaw and the body with respect to each other such that the cutting edge contacts the cable insulation at the cut point diametrically opposite the second position; and
 cutting the cable insulation by setting the blade to the desired depth of cut and rotating the cable stripping tool relative to the cable and using the blade to remove the cable insulation from the cable.

16. A cable stripping tool for cutting insulation on an electrical cable comprising:
 a jaw for positioning a length of cable having a longitudinal cable axis;
 a body for tangentially contacting the cable opposite the jaw;
 a frame member between the jaw and the body for adjusting distance between the jaw and the body to accommodate different cable diameters;
 a blade angle adjustment shaft having a longitudinal shaft axis mounted in the body and rotatable about the longitudinal shaft axis, the shaft having extending radially outwardly a flange for driving the shaft to different angles of rotation with respect to the body;
a blade angle adjustment member bearing on one side of the flange to move the flange and drive the shaft to different angles of rotation; and
a blade for cutting the cable insulation secured to an end of the blade angle adjustment shaft, the blade being adjustable by movement of the blade angle adjustment member against the flange between a position for cutting the cable insulation at a 90° angle with respect to the cable axis, and a position for cutting the cable insulation at more or less than a 90° angle with respect to the cable axis.

17. The cable stripping tool of claim 16 wherein the blade angle adjustment member comprises a screw.

18. A cable stripping tool for cutting insulation on an electrical cable comprising:
a jaw for positioning a length of cable having a longitudinal cable axis;
a body for tangentially contacting the cable opposite the jaw;
a frame member between the jaw and the body for adjusting distance between the jaw and the body to accommodate different cable diameters;
a blade angle adjustment shaft rotatably mounted in the body, the shaft having extending radially outwardly a flange for driving the shaft to different angles of rotation with respect to the body;
a blade angle adjustment member bearing on one side of the flange to move the flange and drive the shaft to different angles of rotation;
an assist spring bearing on the opposite side of the flange to urge the flange against the blade angle adjustment member during movement of the flange to reduce backlash of the shaft; and
a blade for cutting the cable insulation secured to an end of the blade angle adjustment shaft, the blade being adjustable by movement of the blade angle adjustment member against the flange between a position for cutting the cable insulation at a 90° angle with respect to the cable axis, and a position for cutting the cable insulation at more or less than a 90° angle with respect to the cable axis.

19. The cable stripping tool of claim 18 wherein the assist spring is a coil spring with a length adjustable to vary the force applied to the opposite side of the flange.

20. A cable stripping tool for cutting insulation on an electrical cable comprising:
a blade;
a jaw for positioning a length of cable having a longitudinal cable axis;
a body for tangentially contacting the cable opposite the jaw;
a frame member between the jaw and the body for adjusting distance between the jaw and the body to accommodate different cable diameters;
a blade angle adjustment shaft rotatably mounted in the body and moveable toward and away from the cable and the jaw to vary depth of cut of the blade into the cable insulation, the shaft having extending radially outwardly a flange for driving the shaft to different angles of rotation with respect to the body;
a blade angle adjustment member bearing on one side of the flange to move the flange and drive the shaft to different angles of rotation; and
the blade for cutting the cable insulation secured to an end of the blade angle adjustment shaft, the blade being adjustable by movement of the blade angle adjustment member against the flange between a position for cutting the cable insulation at a 90° angle with respect to the cable axis, and a position for cutting the cable insulation at more or less than a 90° angle with respect to the cable axis.

21. A cable stripping tool for cutting insulation on an electrical cable comprising:
a jaw for positioning a length of cable having a longitudinal cable axis;
a body for tangentially contacting the cable opposite the jaw;
a frame member between the jaw and the body for adjusting distance between the jaw and the body to accommodate different cable diameters;
a blade angle adjustment shaft rotatably mounted in the body, the shaft having extending radially outwardly a flange for driving the shaft to different angles of rotation with respect to the body;
a lever bearing on one side of the flange to move the flange and drive the shaft to different angles of rotation; and
a blade for cutting the cable insulation secured to an end of the blade angle adjustment shaft, the blade being adjustable by movement of the lever against the flange between a position for cutting the cable insulation at a 90° angle with respect to the cable axis, and a position for cutting the cable insulation at more or less than a 90° angle with respect to the cable axis.

22. The cable stripping tool of claim 21 wherein the lever is slideable along the body.

23. A method for cutting insulation on an electrical cable comprising:
providing a cable having a longitudinal cable axis and a cable insulation to be removed;
providing a cable stripping tool having a jaw for positioning a length of the cable;
providing a body disposed on the cable stripping tool for tangentially contacting the cable opposite the jaw;
providing a frame member of the cable stripping tool between the jaw and the body for adjusting distance between the jaw and the body to accommodate different cable diameters;
providing a blade angle adjustment shaft having a longitudinal shaft axis mounted in the body and rotatable about the longitudinal shaft axis, the shaft having a flange extending radially and outwardly for driving the shaft to different angles of rotation with respect to the body;
providing a blade angle adjustment member bearing on one side of the flange to move the flange and drive the shaft to different angles of rotation; and
providing a blade secured to an end of the blade angle adjustment shaft for cutting the cable insulation;
adjusting the blade by moving the blade angle adjustment member against the flange to a desired position for cutting the cable insulation at a 90° angle with respect to the cable axis and a position for cutting the cable insulation at more or less than a 90° angle with respect to the cable axis; and
cutting the cable insulation by setting the blade to the desired depth of cut and rotating the cable stripping tool relative to the cable and using the blade to remove the cable insulation from the cable.

24. The method of claim 23 wherein the blade angle adjustment member comprises a screw.

25. A method for cutting insulation on an electrical cable comprising:
   providing a cable having a longitudinal cable axis and a cable insulation to be removed;
   providing a cable stripping tool having a jaw for positioning a length of the cable;
   providing a body disposed on the cable stripping tool for tangentially contacting the cable opposite the jaw;
   providing a frame member of the cable stripping tool between the jaw and the body for adjusting distance between the jaw and the body to accommodate different cable diameters;
   providing a blade angle adjustment shaft rotatably mounted in the body, the shaft having a flange extending radially and outwardly for driving the shaft to different angles of rotation with respect to the body;
   providing a blade angle adjustment member bearing on one side of the flange to move the flange and drive the shaft to different angles of rotation;
   providing a blade secured to an end of the blade angle adjustment shaft for cutting the cable insulation;
   providing an assist spring bearing on the opposite side of the flange to urge the flange against the blade angle adjustment member during movement of the flange to reduce backlash of the shaft;
   adjusting the blade by moving the blade angle adjustment member against the flange to a desired position for cutting the cable insulation at a 90° angle with respect to the cable axis and a position for cutting the cable insulation at more or less than a 90° angle with respect to the cable axis; and
   cutting the cable insulation by setting the blade to the desired depth of cut and rotating the cable stripping tool relative to the cable and using the blade to remove the cable insulation from the cable.

26. A method for cutting insulation on an electrical cable comprising:
   providing a cable having a longitudinal cable axis and a cable insulation to be removed;
   providing a cable stripping tool having a jaw for positioning a length of the cable;
   providing a body disposed on the cable stripping tool for tangentially contacting the cable opposite the jaw;
   providing a frame member of the cable stripping tool between the jaw and the body for adjusting distance between the jaw and the body to accommodate different cable diameters;
   providing a blade angle adjustment shaft rotatably mounted in the body, the shaft having a flange extending radially and outwardly for driving the shaft to different angles of rotation with respect to the body;
   providing a lever bearing on one side of the flange to move the flange and drive the shaft to different angles of rotation; and
   providing a blade secured to an end of the blade angle adjustment shaft for cutting the cable insulation;
   adjusting the blade by moving the lever against the flange to a desired position for cutting the cable insulation at a 90° angle with respect to the cable axis and a position for cutting the cable insulation at more or less than a 90° angle with respect to the cable axis; and
   cutting the cable insulation by setting the blade to the desired depth of cut and rotating the cable stripping tool relative to the cable and using the blade to remove the cable insulation from the cable.

27. The method of claim 26 wherein the lever is slideable along the body.

28. A method for cutting insulation on an electrical cable comprising:
   providing a cable having a longitudinal cable axis and a cable insulation to be removed;
   providing a cable stripping tool having a jaw for positioning a length of the cable;
   providing a body disposed on the cable stripping tool for tangentially contacting the cable opposite the jaw;
   providing a frame member of the cable stripping tool between the jaw and the body for adjusting distance between the jaw and the body to accommodate different cable diameters;
   providing a blade angle adjustment shaft rotatably mounted in the body, the shaft having a flange extending radially and outwardly for driving the shaft to different angles of rotation with respect to the body;
   providing a blade angle adjustment member bearing on one side of the flange to move the flange and drive the shaft to different angles of rotation; and
   providing a blade having a vertical first cutting edge, a second cutting edge oriented perpendicular to the first cutting edge, and a midspan cutting edge, the blade secured to an end of the blade angle adjustment shaft for cutting the cable insulation;
   adjusting the blade by moving the blade angle adjustment member against the flange to a desired position for cutting the cable insulation at a 90° angle with respect to the cable axis and a position for cutting the cable insulation at more or less than a 90° angle with respect to the cable axis; and
   cutting the cable insulation by setting the blade to the desired depth of cut and rotating the cable stripping tool relative to the cable and using the blade to remove the cable insulation from the cable.

29. A method for cutting insulation on an electrical cable comprising:
   providing a cable having a longitudinal cable axis and a cable insulation to be removed;
   providing a cable stripping tool having a jaw for positioning a length of the cable;
   providing a body disposed on the cable stripping tool for tangentially contacting the cable opposite the jaw wherein a portion of the body of the cable stripping tool contacting the cable insulation forms a loading ramp to hold the cable in position against the jaw;
   providing a frame member of the cable stripping tool between the jaw and the body for adjusting distance between the jaw and the body to accommodate different cable diameters;
   providing a blade angle adjustment shaft rotatably mounted in the body, the shaft having a flange extending radially and outwardly for driving the shaft to different angles of rotation with respect to the body;
   providing a blade angle adjustment member bearing on one side of the flange to move the flange and drive the shaft to different angles of rotation; and
   providing a blade secured to an end of the blade angle adjustment shaft for cutting the cable insulation;
   adjusting the blade by moving the blade angle adjustment member against the flange to a desired position for cutting the cable insulation at a 90° angle with respect to the cable axis and a position for cutting the cable insulation at more or less than a 90° angle with respect to the cable axis; and
   cutting the cable insulation by setting the blade to the desired depth of cut and rotating the cable stripping tool relative to the cable and using the blade to remove the cable insulation from the cable.

* * * * *